United States Patent
Maliyakkal

(10) Patent No.: US 11,394,579 B1
(45) Date of Patent: Jul. 19, 2022

(54) SMART CONTROLLER AREA NETWORK TERMINATION

(71) Applicant: Volvo Car Corporation, Gothenburg (SE)

(72) Inventor: Shefeen Maliyakkal, Gothenburg (SE)

(73) Assignee: VOLVO CAR CORPORATION, Gothenburg (SE)

(*) Notice: Subject to any disclaimer, the term of this patent is extended or adjusted under 35 U.S.C. 154(b) by 0 days.

(21) Appl. No.: 17/353,404

(22) Filed: Jun. 21, 2021

(51) Int. Cl.
*H04L 12/40* (2006.01)
*H04L 12/50* (2006.01)
*H04L 25/02* (2006.01)

(52) U.S. Cl.
CPC ........ *H04L 12/40182* (2013.01); *H04L 12/50* (2013.01); *H04L 25/0278* (2013.01); *H04L 2012/40215* (2013.01)

(58) Field of Classification Search
CPC . H04L 12/40182; H04L 12/50; H04L 25/028; H04L 2012/40215
See application file for complete search history.

(56) References Cited

U.S. PATENT DOCUMENTS

| | | | |
|---|---|---|---|
| 10,180,460 B1* | 1/2019 | Castelaz | G01R 31/3842 |
| 10,273,795 B1* | 4/2019 | Chu | H04L 41/12 |
| 2013/0002262 A1* | 1/2013 | Tago | G01R 31/52 324/503 |
| 2017/0084088 A1* | 3/2017 | Reichardt | G05B 15/02 |
| 2018/0198481 A1* | 7/2018 | Bavois | H04L 12/40032 |
| 2018/0304828 A1* | 10/2018 | Kitani | B60W 50/023 |
| 2018/0367347 A1* | 12/2018 | Gscheidle | H04L 25/0298 |
| 2020/0067728 A1* | 2/2020 | Sonnek | H04L 67/2804 |

* cited by examiner

*Primary Examiner* — Henry Tsai
*Assistant Examiner* — John B Roche
(74) *Attorney, Agent, or Firm* — Amin, Turocy & Watson, LLP

(57) ABSTRACT

Systems and techniques that facilitate smart CAN termination are provided. In various embodiments, a system can comprise a sensor component that can measure an impedance of a controller area network (CAN) bus. In various aspects, the system can further comprise a termination component that can convert at least one node of the CAN bus from a non-terminating state to a terminating state, based on the impedance.

20 Claims, 11 Drawing Sheets

SMART CONTROLLER AREA NETWORK TERMINATION

TECHNICAL FIELD

The subject disclosure relates to controller area network (CAN), and more specifically to smart CAN termination.

BACKGROUND

Controller area network (CAN) is a data communication protocol that is generally used for broadcasting sensor data and/or control data on two-wire interconnections between different parts of an electronic control system. A CAN bus is structured to have a high-line, a low-line, and one or more nodes, with each node being coupled to both the high-line and the low-line. Proper functioning of the CAN bus necessitates that both physical endpoints of the CAN bus be capped with terminating resistances. Generally, this is facilitated by applying a terminating resistance to a very first node of the CAN bus and another terminating resistance to a very last node of the CAN bus, with such nodes being referred to as "terminating nodes." Terminating resistances are not applied to other nodes that are between the terminating nodes, and so such other nodes are referred to as "non-terminating nodes." When an electronic connection to a terminating node is lost, performance of the CAN bus is negatively affected. Existing techniques for repairing the performance of the CAN bus, such as re-routing or double termination, are not optimal.

Systems and/or techniques that can address one or more of these problems can be desirable.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that can facilitate smart CAN termination are described.

According to one or more embodiments, a system is provided. The system can comprise a memory that can store computer-executable components. The system can further comprise a processor that can be operably coupled to the memory and that can execute the computer-executable components stored in the memory. In various embodiments, the computer-executable components can comprise a sensor component. In various aspects, the sensor component can measure an impedance of a controller area network (CAN) bus. In various instances, the computer-executable component can comprise a termination component. In various cases, the termination component can convert at least one node of the CAN bus from a non-terminating state to a terminating state, based on the impedance.

According to one or more embodiments, the above-described system can be implemented as a computer-implemented method and/or computer program product.

DETAILED DESCRIPTION

Figure 1:
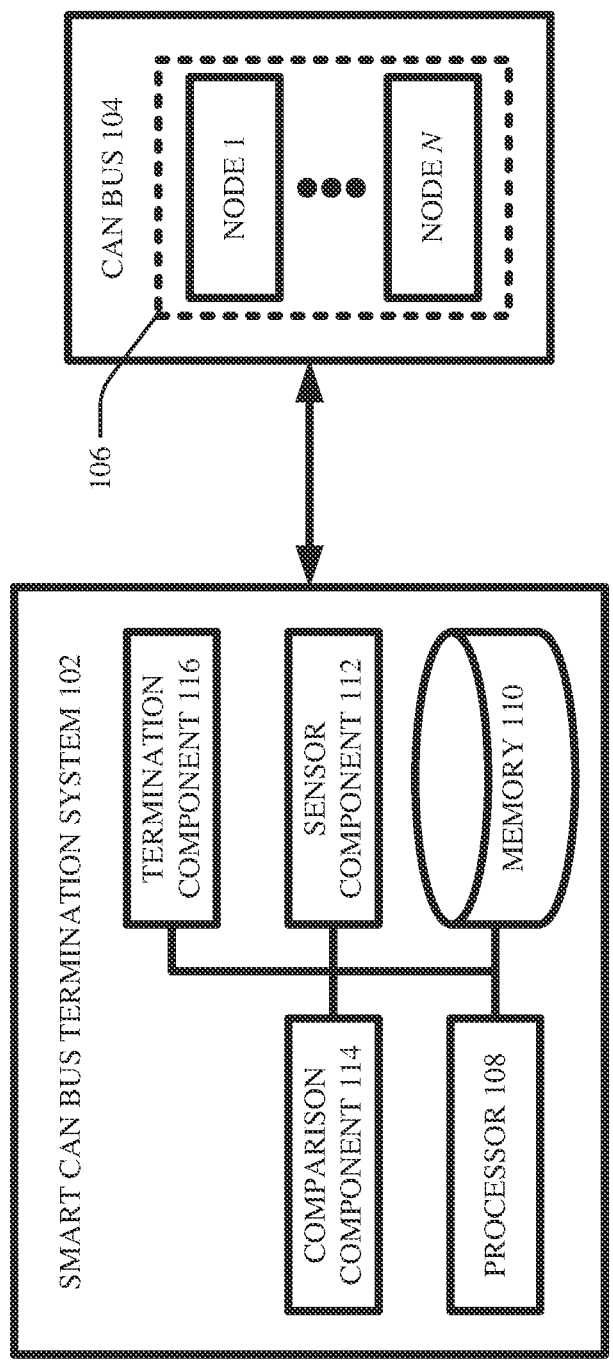
FIG. 1 illustrates a block diagram of an example, non-limiting system that facilitates smart CAN termination in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Controller area network (CAN), including both classical controller area network (Classical CAN) and controller area network flexible data-rate (CAN-FD), is a data communication protocol that is generally used for broadcasting sensor data and/or control data on two-wire interconnections between different parts of an electronic control system. CAN is particularly popular in the automotive field. Specifically, CAN buses can be implemented in a vehicle, so as to communicatively couple various electronic modules (e.g., accelerometer module, fuel sensor module, temperature sensor module, engine control module, door/window module, airbag/safety module, air conditioning module) of the vehicle together.

The physical topology of a CAN bus can include a high-line, a low-line, and a set of nodes, with each node being coupled to both the high-line and the low-line. Moreover, the high-line and the low-line of the CAN bus can together be considered as forming a path that has two physical endpoints, where one of the set of nodes is coupled to both the high-line and the low-line at one of the two physical endpoints, where another of the set of nodes is coupled to both the high-line and the low-line at the other of the two physical endpoints, and where the rest of the set of nodes are coupled to both the high-line and the low-line at various sequential points along the path between the two physical endpoints.

Proper functioning of the CAN bus can require that both of the two physical endpoints be capped with terminating resistances. This can be facilitated by applying a terminating resistance to the node that is placed at and/or near the first physical endpoint (e.g., implementing the terminating resistance in parallel with the node at the first endpoint) and by applying another terminating resistance to the node that is placed at and/or near the second physical endpoint (e.g., again, implementing the terminating resistance in parallel with the node at the second endpoint). Accordingly, the two nodes to which terminating resistances are applied can be referred to as "terminating nodes." The rest of the set of nodes that are placed in between the terminating nodes can lack terminating resistances, and so such nodes can be referred to as "non-terminating nodes."

When an electronic connection to a terminating node is lost (e.g., such as due to a crash of the terminating node), performance of the CAN bus can be negatively affected. Specifically, the CAN bus can experience significantly degraded signal quality and/or significantly reduced electromagnetic compatibility when one or both of the terminating nodes are lost, which can cause other modules coupled to the CAN bus to stop functioning properly. Existing techniques for repairing the performance of the CAN bus, such as re-routing or double termination, are not optimal. Thus, systems and/or techniques for restoring performance of the CAN bus when one or both terminating nodes are lost can be desirable.

Various embodiments of the invention can address one or more of these technical problems by facilitating smart CAN termination. In particular, various embodiments of the invention can be considered as a computerized tool (e.g., any suitable combination of computer-executable hardware and/or computer-executable software) that can electronically monitor a CAN bus and that can electronically restore performance of the CAN bus when one or both terminating nodes are lost. More specifically, the computerized tool can electronically measure an impedance of the CAN bus, can electronically determine whether one or both terminating nodes are lost based on the impedance, and/or can electronically apply terminating resistances to one or more non-terminating nodes based on the determination, such that the one or more non-terminating nodes can now function as terminating nodes. In other words, the computerized tool can detect when a terminating node of the CAN bus is lost, and the computerized tool can replace the lost terminating node by converting a nearby one of the remaining nodes of the CAN bus from a non-terminating state to a terminating state. So, when a terminating node is lost, the computerized tool can ensure that another terminating node is created to take its place, with the result being that the CAN bus is properly terminated. Accordingly, when the performance of the CAN bus suffers due to loss of a terminating node, the computerized tool can rectify the performance of the CAN bus by changing one of the remaining nodes to a terminating node.

In various embodiments, the computerized tool described herein can comprise a sensor component, a comparison component, and/or a termination component.

In various aspects, as mentioned above, a CAN bus (e.g., a Classical CAN bus, a CAN-FD bus) can comprise a high-line, a low-line, and/or a set of nodes that are each coupled to both the high-line and the low-line. In various instances, the set of nodes can comprise three or more nodes. In various cases, each node of the set of nodes can be any suitable computerized module that can receive signals from and/or transmit signals to the CAN bus.

In various cases, each node of the set of nodes can correspond to one or more switchable terminating resistors. More specifically, each node can be coupled in parallel with its corresponding switchable terminating resistor. In various aspects, a switchable terminating resistor can comprise one or more resistors that are coupled to the high-line and the low-line of the CAN bus in any suitable fashion/arrangement by one or more switches. For any given node, if the one or more switches of the switchable terminating resistor that corresponds to the given node are closed, the one or more resistors that correspond to the switchable terminating resistor can be electrically active (e.g., can receive electric signals/current from the high-line and/or the low-line of the CAN bus). If the one or more resistors of the switchable terminating resistor corresponding to the given node are electrically active, the given node can be considered to be in a terminating state. On the other hand, for any given node, if the one or more switches of the switchable terminating resistor that corresponds to that given node are open, the one or more resistors that correspond to the switchable terminating resistor can be electrically inactive (e.g., can fail to receive electric signals/current from the high-line and/or the low-line of the CAN bus). If the one or more resistors of the switchable terminating resistor corresponding to the given node are electrically inactive, the given node can be considered to be in a non-terminating state. Accordingly, each of the set of nodes can be selectably terminable. For instance, any node can be converted from a non-terminating state to a terminating state by closing the one or more switches of the switchable terminating resistor that corresponds to that node. Conversely, any node can be converted from a terminating state to a non-terminating state by opening the one or more switches of the switchable terminating resistor that corresponds to that node.

In various embodiments, the sensor component of the computerized tool can electronically measure an impedance of the CAN bus. More specifically, the sensor component can comprise any suitable impedance sensor that can be electrically coupled to and/or otherwise integrated with the CAN bus. Accordingly, the sensor component can, via the impedance sensor, measure, detect, and/or otherwise quantify the impedance exhibited by the CAN bus at any suitable moment in time and/or over any suitable timespan. Those having ordinary skill in the art will appreciate that the impedance sensor can implement any suitable impedance-measuring techniques and/or impedance-measuring circuitry. For instance, the impedance sensor can, in various cases, be any suitable form of an impedance analyzer and/or a multimeter.

In various embodiments, the comparison component of the computerized tool can electronically compare the impedance as measured by the sensor component to any suitable thresholds, so as to determine whether and/or how many terminating nodes of the CAN bus are lost. More specifically, because each of the set of nodes can be considered as being coupled in parallel with each other, the two terminating nodes can likewise be in parallel with each other. Thus, the comparison component can leverage the rule governing combination of parallel resistances to determine whether and/or how many terminating nodes are lost. In various aspects, due to how parallel resistances combine (e.g., the reciprocal of the sum of the reciprocals of two parallel resistances is lesser than each of the two parallel resistances individually), the impedance of the CAN bus can increase if one of the two terminating nodes is lost. By the same logic, the impedance of the CAN bus can increase even further if both of the two terminating nodes are lost. Accordingly, the comparison component can leverage two predetermined thresholds to determine whether and/or how many terminating nodes of the CAN bus are lost.

For instance, the comparison component can have any suitable form of electronic access to a double-loss threshold and to a single-loss threshold. In various cases, the double-loss threshold can represent a minimum impedance value of the CAN bus that occurs when both of the terminating nodes are lost. Similarly, the single-loss threshold can represent a minimum impedance value of the CAN bus that occurs when one of the two terminating nodes is lost. Again, due to the nature of parallel resistors, the double-loss threshold can be greater than the single-loss threshold. Thus, the comparison component can, in various instances, compare the impedance measured by the sensor component to the double-loss threshold. If the impedance is greater than the double-loss threshold, the comparison component can conclude and/or determine that both terminating nodes of the CAN bus are lost. If the impedance is not greater than the double-loss threshold, the comparison component can compare the impedance to the single-loss threshold. If the impedance is greater than the single-loss threshold, the comparison component can conclude and/or determine that one of the two-terminating nodes is lost. If the impedance is not greater than the single-loss threshold, the comparison component can conclude and/or determine that neither of the two terminating nodes is lost.

Those having ordinary skill in the art will appreciate that the magnitudes of the double-loss threshold and/or the single-loss threshold can depend upon the characteristics and/or properties of the CAN bus (e.g., can depend upon the resistance values of the switchable terminating resistor of each node of the CAN bus and/or upon other electrical components/loads coupled to the CAN bus). Accordingly, those having ordinary skill in the art will understand that the double-loss threshold and/or the single-loss threshold can be determined experimentally and/or analytically based on the CAN bus.

In various embodiments, the termination component of the computerized tool can electronically convert at least one node of the CAN bus from a non-terminating state to a terminating state, based on the conclusion and/or determination of the comparison component. In various aspects, as mentioned above, each node of the CAN bus can have a corresponding switchable terminating resistor. In various instances, the termination component can be coupled, via any suitable control-logic-circuitry, to the switchable terminating resistor of each node. Accordingly, for any given node, the termination component can, in various aspects, transmit a control signal to the switchable terminating resistor of the given node, which can cause the one or more switches of the switchable terminating resistor to open or close. If the one or more switches of the switchable terminating resistor are open, the switchable terminating resistor can be electrically inactive, and so the given node can be in a non-terminating state. On the other hand, if the one or more switches are closed, the switchable terminating resistor can be electrically active, and so the given node can be in a terminating state. Thus, if the control signal causes the one or more switches to change from open to closed, the control signal can be considered as converting the given node from a non-terminating state to a terminating state. Conversely, if the control signal causes the one or more switches to change from closed to open, the control signal can be considered as converting the given node from a terminating state to a non-terminating state. In this way, the termination component can convert any node of the CAN bus from a non-terminating state to a terminating state, and/or vice versa.

In various aspects, if the comparison component determines that both terminating nodes of the CAN bus are lost, the termination component can electronically transmit control signals to the switchable terminating resistors of two of the remaining nodes in the CAN bus. In other words, when both terminating nodes of the CAN bus are lost, the termination component can replace those two lost terminating nodes with two of the remaining nodes, by converting the two of the remaining nodes to terminating states. More specifically, the set of nodes of the CAN bus can be ordered and/or indexed in any suitable fashion, with one of the two terminating nodes representing one end of such ordering/indexing and with the other of the two terminating nodes representing the other end of such ordering/indexing. In various instances, if the comparison component concludes that both terminating nodes are lost, the termination component can identify the two of the remaining nodes that are respectively adjacent and/or otherwise nearest to the two lost terminating nodes, according to the ordering/indexing. Once those two remaining nodes are identified, the termination component can transmit control signals to the switchable terminating resistors of those two remaining nodes, thereby converting them to terminating states. Thus, those two remaining nodes can now be considered as two new terminating nodes. As a result, the CAN bus can again have two terminating nodes, which can restore proper performance of the CAN bus.

In various instances, if the comparison component instead determines that only one terminating node of the CAN bus is lost, the termination component can electronically transmit control signals to the switchable terminating resistor of one of the remaining nodes in the CAN bus. In other words, when one terminating node of the CAN bus is lost, the termination component can replace that one lost terminating node with one of the remaining nodes, by converting the one of the remaining nodes to a terminating state. More specifically, just as above, the set of nodes of the CAN bus can be ordered and/or indexed in any suitable fashion, with one of the two terminating nodes representing one end of such ordering/indexing and with the other of the two terminating nodes representing the other end of such ordering/indexing. In various instances, if the comparison component concludes that one terminating node is lost, the termination component can identify which terminating node is lost. For example, the termination component can attempt to communicate with both terminating nodes, and whichever terminating node fails to respond can be considered as lost. In various cases, the termination component can identify a remaining node that is adjacent and/or otherwise nearest to the lost terminating node, according to the ordering/indexing. Once that remaining node is identified, the termination component can transmit control signals to the switchable terminating resistor of that remaining node, thereby converting it to a terminating state. Thus, that remaining node can now be considered as a new terminating node. As a result, the CAN bus can again have two terminating nodes, which can restore proper performance of the CAN bus.

To help clarify some of the above discussion, consider the following non-limiting example. Suppose that a CAN bus comprises a high-line, a low-line, and five nodes: node 1, node 2, node 3, node 4, and node 5, each corresponding to a switchable terminating resistor. Furthermore, suppose that the five nodes are ordered in the CAN bus according to their indexes: that is, node 1 is located at one endpoint of the CAN bus, node 5 is located at the other endpoint of the CAN bus, node 2 is adjacent to node 1 and node 3, node 3 is adjacent to node 2 and node 4, and node 4 is adjacent to node 3 and node 5. Because node 1 and node 5 are located at the endpoints of the CAN bus, they can initially be the two terminating nodes. That is, node 1 and node 5 can be in terminating states (e.g., the switches of the switchable terminating resistors of node 1 and node 5 can be closed), while nodes 2-4 can be in non-terminating states (e.g., the switches of the switchable terminating resistors of nodes 2-4 can be open).

In various aspects, the sensor component of the computerized tool can, via the impedance sensor, measure the impedance of the CAN bus. In various instances, the comparison component of the computerized tool can compare the impedance to the double-loss threshold. If the impedance is greater than the double-loss threshold, the comparison component can conclude that both node 1 and node 5 are lost. In other words, the comparison component can determine that node 1 and node 5 cannot be communicated and/or otherwise interacted with via the CAN bus. At such point, the CAN bus can be considered as not properly terminated, which can degrade the performance of the CAN bus. Accordingly, the termination component of the computerized tool can identify two of the remaining nodes 2-4 that are respectively adjacent to node 1 and node 5. Here, node 2 is a remaining (e.g., not lost) node that is adjacent to node 1, and node 4 is a remaining node that is adjacent to node 5. Thus, the termination component can transmit a control signal to the switchable terminating resistor of node 2, thereby causing node 2 to change from a non-terminating state to a terminating state. Similarly, the termination component can transmit another control signal to the switchable terminating resistor of node 4, thereby causing node 4 to change from a non-terminating state to a terminating state. At such point, the CAN bus can be considered as properly terminated, with node 2 and node 4 functioning as the new terminating nodes. Thus, the performance of the CAN bus can be restored, notwithstanding the loss of node 1 and node 5.

If the impedance is not greater than the double-loss threshold, the comparison component can compare the impedance to the single-loss threshold. If the impedance is greater than the single-loss threshold, the comparison component can conclude that only one of node 1 and node 5 are lost. At such point, the CAN bus can be considered as not properly terminated, which can degrade the performance of the CAN bus. Accordingly, the termination component of the computerized tool can identify which of node 1 and node 5 is lost. For instance, the termination component can attempt to electronically communicate with both node 1 and node 5. If node 1 properly responds while node 5 fails to properly respond, it can be inferred that node 5 is lost. Conversely, if node 1 fails to properly respond while node 5 properly responds, it can be inferred that node 1 is lost. Once the lost terminating node is identified, the termination component can identify one of the remaining nodes 2-4 that is adjacent to the lost terminating node. If node 1 is lost, node 2 is the remaining (e.g., not lost) node that is adjacent to the lost terminating node. On the other hand, if node 5 is lost, node 4 is the remaining node that is adjacent to the lost terminating node. In any case, the termination component can transmit a control signal to the switchable terminating resistor of the remaining node that is adjacent to the lost terminating node, thereby causing that remaining node to change from a non-terminating state to a terminating state. At such point, the CAN bus can be considered as properly terminated, with the remaining node that is adjacent to the lost terminating node functioning as a new terminating node. For instance, if node 1 is lost, node 2 can be converted to a terminating state, meaning that node 2 can function as a new terminating node. Conversely, if node 5 is lost, node 4 can be converted to a terminating state, meaning that node 4 can function as a new terminating node. In any case, the performance of the CAN bus can be restored, notwithstanding the loss of one of the terminating nodes.

Accordingly, a computerized tool as described herein can periodically monitor the impedance of a CAN bus to detect loss of one or both terminating nodes of the CAN bus. If the computerized tool determines that one or both of the terminating nodes are lost, the computerized tool can convert one or more of the remaining nodes of the CAN bus from non-terminating states to terminating states. Thus, the computerized tool can dynamically keep the CAN bus properly terminated, even when one or both terminating nodes of the CAN bus are lost due to system crashes.

Various embodiments of the invention can be employed to use hardware and/or software to solve problems that are highly technical in nature (e.g., to facilitate smart CAN termination), that are not abstract and that cannot be performed as a set of mental acts by a human. Further, some of the processes performed can be performed by a specialized computer. Specifically, such processes can include: measuring, by a device operatively coupled to a processor, an impedance of a controller area network (CAN) bus; and converting, by the device, at least one node of the CAN bus from a non-terminating state to a terminating state, based on the impedance; wherein the at least one node of the CAN bus is associated with a switchable terminating resistor having one or more switches, wherein the at least one node is in the non-terminating state when the one or more switches are open, and wherein the at least one node is in the terminating state when the one or more switches are closed. Such defined tasks are not performed manually by humans. Moreover, neither the human mind nor a human with pen and paper can electronically measure an electrical impedance of a CAN bus, and/or electronically change a termination status of a node of the CAN bus based on the measured impedance. Instead, various embodiments of the invention are inherently and inextricably tied to computer technology and cannot be implemented outside of a computing environment (e.g., a CAN bus is a specific circuit topology that is inherently related to computing devices; thus, a computerized tool that monitors the CAN bus for lost terminating nodes and accordingly converts non-terminating nodes to terminating nodes so as to preserve the performance of the CAN bus can exist only in a computerized environment and cannot be implemented in any sensible way without computers).

In various instances, embodiments of the invention can integrate into a practical application the disclosed teachings regarding smart CAN termination. Indeed, as described herein, various embodiments of the invention, which can take the form of systems and/or computer-implemented methods, can be considered as a computerized tool that can electronically measure the impedance of a CAN bus, that can electronically determine whether and/or how many terminating nodes of the CAN bus are lost based on the impedance, and/or that can electronically transmit control signals to switchable terminating resistors corresponding to one or more remaining nodes of the CAN bus, so as to convert the one or more remaining nodes from non-terminating states to terminating states. In other words, such a computerized tool can help to ensure that a CAN bus is properly terminated during operation, even if the CAN bus experiences a system crash that causes one or both of its existing terminating nodes to be lost. Without the computerized tool, the performance of a CAN bus that loses one or both terminating nodes would be severely degraded. On the other hand, when the computerized tool is implemented, the performance of a CAN bus that loses one or both terminating nodes can, in various aspects, be restored in real-time. Thus, the computerized tool as described herein can be implemented so as to help a CAN bus overcome the technical problem of lost terminating nodes. That is, the computerized tool can improve the very functioning/performance of a CAN bus, and thus the computerized tool certainly constitutes a concrete and tangible technical improvement in the field of controller area networks.

Furthermore, various embodiments of the invention can control tangible, hardware-based, and/or software-based devices based on the disclosed teachings. For example, a CAN bus can be real-world circuit architecture that includes a high-line, a low-line, and a set of nodes, with each node corresponding to a switchable terminating resistor. As explained herein, a switchable terminating resistor can itself be a real-world circuit structure comprising one or more resistors and/or one or more switches that couple the one or more resistors to the high-line and the low-line. When the one or more switches of the switchable terminating resistor of a given node are open, the switchable terminating resistor can be electrically inactive, meaning that the given node can be in a non-terminating state. On the other hand, when the one or more switches of the switchable terminating resistor of the given node are closed, the switchable terminating resistor can be electrically active, meaning that the given node can be in a terminating state. Accordingly, the computerized tool described herein can send real-world control signals to the real-world switchable terminating resistors of any given node, thereby causing that given node to change from a non-terminating state to a terminating state, or vice versa. In any case, such a computerized tool constitutes real-world computer hardware that is interacting with real-world CAN bus circuitry to solve the problem of lost terminating nodes.

It should be appreciated that the figures and the herein disclosure describe non-limiting examples of various embodiments of the invention and are not necessarily drawn to scale.

FIG. 1 illustrates a block diagram of an example, non-limiting system 100 that can facilitate smart CAN termination in accordance with one or more embodiments described herein. As shown, a smart CAN bus termination system 102 can be electronically integrated, via any suitable wired and/or wireless electronic connection, with a CAN bus 104.

In various embodiments, the CAN bus 104 can be a Classical CAN bus, a CAN-FD bus, and/or any other suitable type of CAN bus. More specifically, the CAN bus 104 can comprise a high-line, a low-line, and/or a set of nodes 106, with each of the set of nodes 106 being coupled between the high-line and the low-line. In various aspects, the set of nodes 106 can comprise n nodes, for any suitable positive integer n (e.g., node 1 to node n). In various instances, because each of the set of nodes 106 can be coupled to both the high-line and the low-line, the set of nodes 106 can be considered as being coupled in parallel with each other. Furthermore, in various cases, the high-line and the low-line of the CAN bus 104 can form a path, such that the path includes two physical endpoints. In various aspects, node 1 of the set of nodes 106 can be positioned at and/or near one of the two physical endpoints of the CAN bus 104. Likewise, node n of the set of nodes 106 can be positioned at and/or near the other of the two physical endpoints of the CAN bus 104. In various instances, the remainder of the set of nodes 106 (e.g., node 2 to node n−1, which are not shown) can be positioned at corresponding points of the CAN bus 104 that are between the two physical endpoints (e.g., such that node 2 is adjacent to node 1, node 3 is adjacent to node 2, . . . , and node n is adjacent to node n−1).

In various aspects, each of the set of nodes 106 can have, correspond to, and/or otherwise be associated with a switchable terminating resistor. In various instances, a switchable terminating resistor can comprise any suitable number of electrical resistance elements (e.g., resistors having defined resistance values measured in Ohms) that are coupled, in any suitable fashion and/or arrangement via any suitable number of electrical switches, to the high-line and the low-line of the CAN bus 104. In various cases, if the electrical switches of a switchable terminating resistor are open, the switchable terminating resistor can be considered as electrically inactive. That is, the electrical resistance elements of the switchable terminating resistor can be unable to receive current from the high-line and/or low-line of the CAN bus 104. Conversely, in various cases, if the electrical switches of a switchable terminating resistor are closed, the switchable terminating resistor can be considered as electrically active. That is, the electrical resistance elements of the switchable terminating resistor can be able to receive current from the high-line and/or low-line of the CAN bus 104.

As mentioned above, each of the set of nodes 106 can have a corresponding switchable terminating resistor (e.g., n nodes, n switchable terminating resistors, one switchable terminating resistor per node). More specifically, each of the set of nodes 106 can be coupled in parallel with its corresponding switchable terminating resistor. In various instances, for any given node, if the switchable terminating resistor of the given node is electrically inactive, the given node can be considered as being in a non-terminating state. After all, if the switchable terminating resistor of the given node is electrically inactive, the switchable terminating resistor cannot function so as to apply a terminating resistance to the given node. On the other hand, if the switchable terminating resistor of the given node is electrically active, the given node can be considered as being in a terminating state. After all, if the switchable terminating resistor of the given node is electrically active, the switchable terminating resistor can function so as to apply a terminating resistance to the given node. Thus, each of the set of nodes 106 can, in various aspects, be converted from a non-terminating state to a terminating state, and/or vice versa, by controllably closing and/or opening the switches of the switchable terminating resistor that corresponds to the node.

In various instances, because node 1 and node n can be positioned at the two physical endpoints of the CAN bus 104, node 1 and node n can initially be configured to be in terminating states. Moreover, because the rest of the set of nodes 106 (e.g., node 2 to node n−1) can be positioned at locations between the two physical endpoints of the CAN bus 104, the rest of the set of nodes 106 can initially be configured to be in non-terminating states. Accordingly, the CAN bus 104 can have two terminating nodes, which can mean that the CAN bus 104 is properly terminated. In various aspects, it is possible that the CAN bus 104 experiences one or more system crashes, which can cause the CAN bus 104 to lose electrical connections to one or both of its two terminating nodes. In such case, a terminating node with which electric connection has been lost can be referred to as a lost terminating node. In various instances, if one or both of the two terminating nodes of the CAN bus 104 are lost, the performance of the CAN bus 104 can be significantly negatively impacted (e.g., signal quality can be degraded). In various aspects, as described herein, the smart CAN bus termination system 102 can periodically monitor the CAN bus 104 so as to restore the performance of the CAN bus 104 if one or both of the terminating nodes are lost.

In various embodiments, the smart CAN bus termination system 102 can comprise a processor 108 (e.g., computer processing unit, microprocessor) and a computer-readable memory 110 that is operably connected to the processor 108. The memory 110 can store computer-executable instructions which, upon execution by the processor 108, can cause the processor 108 and/or other components of the smart CAN bus termination system 102 (e.g., sensor component 112, comparison component 114, termination component 116) to perform one or more acts. In various embodiments, the memory 110 can store computer-executable components (e.g., sensor component 112, comparison component 114, termination component 116), and the processor 108 can execute the computer-executable components.

In various embodiments, the smart CAN bus termination system 102 can comprise a sensor component 112. In various aspects, the sensor component 112 can electronically measure an impedance of the CAN bus 104. In various instances, the sensor component 112 can measure the impedance by implementing any suitable impedance sensor (e.g., impedance analyzer, multimeter) that can be electronically integrated with the CAN bus 104.

In various embodiments, the smart CAN bus termination system 102 can comprise a comparison component 114. In various aspects, the comparison component 114 can electronically compare the impedance measured by the sensor component 112 to any suitable threshold values, so as to determine whether and/or how many of the terminating nodes of the CAN bus 104 are lost. As mentioned above, the terminating nodes of the CAN bus 104 can be in parallel with each other. Accordingly, their respective terminating resistances can also be in parallel with each other. Thus, the rule governing how parallel resistances sum together (e.g., reciprocal of the sum of the reciprocals) can be leveraged to determine whether and/or how many of the terminating nodes of the CAN bus 104 are lost. More specifically, if both terminating nodes are not lost, the impedance of the CAN bus 104 can be expected to be at and/or near a first predetermined value (e.g., which can be based on the properties/characteristics of the CAN bus 104). If one of the terminating nodes is lost, the impedance of the CAN bus 104 can be expected to increase to and/or near a second predetermined value (e.g., again, can be based on the properties/characteristics of the CAN bus 104) that is greater than the first predetermined value. Moreover, if both terminating nodes are lost, the impedance of the CAN bus 104 can be expected to increase even more to and/or near a third predetermined value (e.g., again, can be based on the properties/characteristics of the CAN bus 104) that is greater than the second predetermined value. Accordingly, the comparison component 114 can conclude and/or determine whether and/or how many of the terminating nodes of the CAN bus 104 are lost, by comparing the impedance measured by the sensor component 112 to the second predetermined value and/or to the third predetermined value (e.g., if the impedance is greater than both the third predetermined value and the second predetermined value, both terminating nodes are lost; if the impedance is less than the third predetermined value and greater than the second predetermined value, only one terminating node is lost; and if the impedance is less than both the third predetermined value and the second predetermined value, no terminating node is lost).

In various embodiments, the smart CAN bus termination system 102 can comprise a termination component 116. In various aspects, the termination component 116 can electronically transmit control signals to one or more of the set of nodes 106, based on the conclusion/determination produced by the comparison component 114. For instance, if the comparison component 114 determines that both terminating nodes of the CAN bus 104 are lost, the termination component 116 can identify two remaining nodes of the set of nodes 106 that are not lost and/or that are respectively adjacent to the two lost terminating nodes. Thus, the termination component can transmit control signals to the switchable terminating resistors of those two remaining nodes, thereby converting those two remaining nodes from non-terminating states to terminating states. As another example, if the comparison component 114 determines that only one terminating node of the CAN bus 104 is lost, the termination component 116 can identify one remaining node of the set of nodes 106 that is not lost and/or that is adjacent to the lost terminating node. Accordingly, the termination component can transmit a control signal to the switchable terminating resistor of that one remaining node, thereby converting that one remaining node from a non-terminating state to a terminating state. In any case, based on how many terminating nodes are lost as determined by the comparison component 114, the termination component 116 can cause a corresponding number of the rest of the set of nodes 106 to enter terminating states, so as to cause the CAN bus 104 to be properly terminated.

Figure 2:
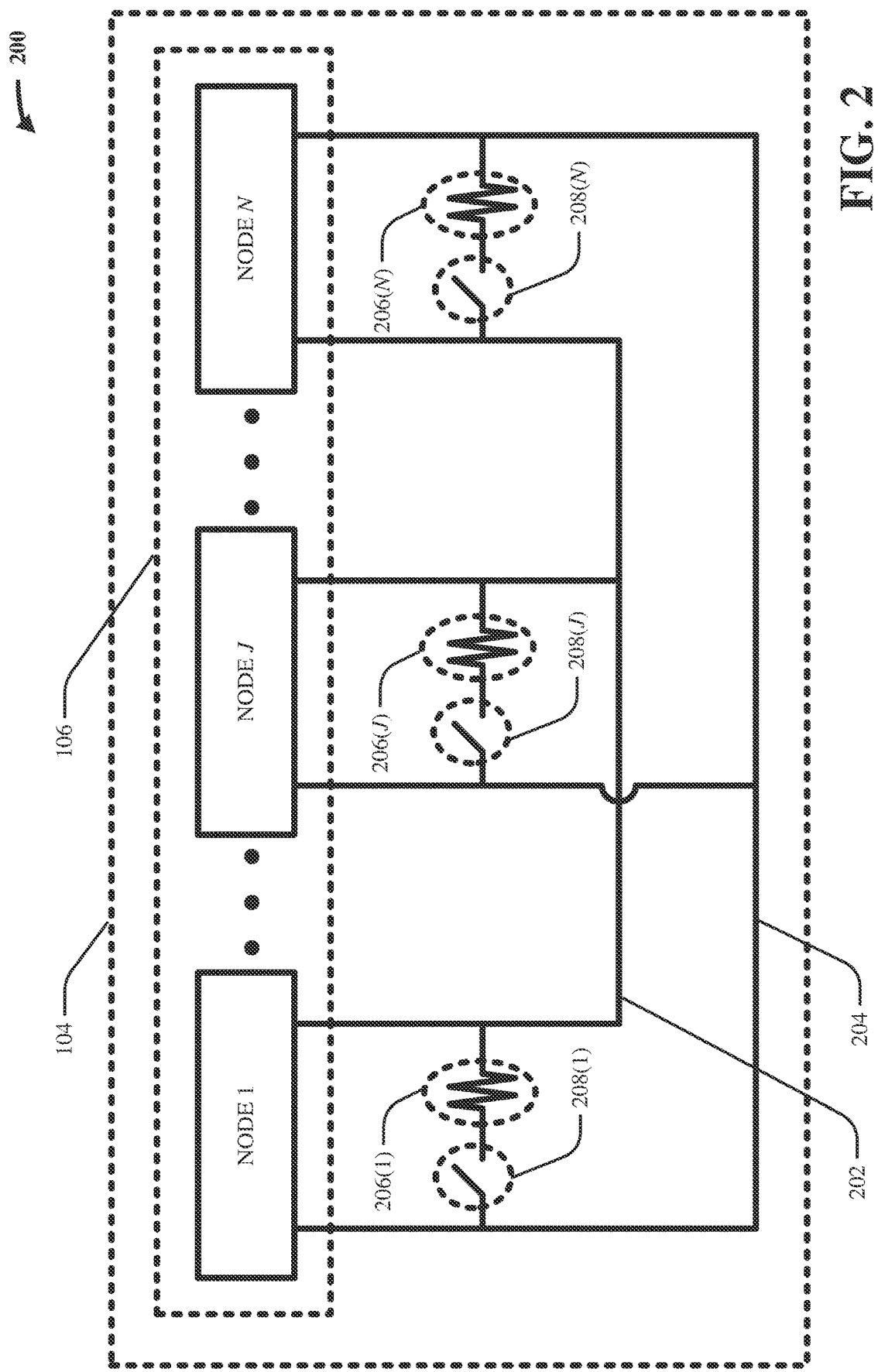
FIG. 2 illustrates a block diagram of an example, non-limiting smart CAN bus in accordance with one or more embodiments described herein.

FIG. 2 illustrates a block diagram 200 of an example, non-limiting smart CAN bus in accordance with one or more embodiments described herein. In other words, FIG. 2 depicts an example and non-limiting embodiment of the CAN bus 104.

As shown, the CAN bus 104 can comprise a high-line 202 and/or a low-line 204, which can be considered as collectively forming a path that defines the CAN bus 104. Note that although FIG. 2 depicts such path as being straight and/or linear (e.g., from the left side of FIG. 2 straight to the right side of FIG. 2), this is a mere non-limiting example. In various cases, the CAN bus 104 can be shaped and/or arranged in any suitable fashion. In various instances, each of the set of nodes 106 can be coupled to both the high-line 202 and/or the low-line 204, as shown. As mentioned above, the set of nodes 106 can comprise n nodes, for any suitable positive integer n. That is, the set of nodes 106 can comprise node 1 to node n. As shown, the node 1 can be positioned and/or located at one physical endpoint of the CAN bus 104 (e.g., at a left endpoint of the path formed by the CAN bus 104). Also as shown, the node n can be positioned and/or located at another physical endpoint of the CAN bus 104 (e.g., at a right endpoint of the path formed by the CAN bus 104). In various cases, a node j, for any suitable positive integer 1<j<n, can represent an intermediate node that is positioned and/or located at a corresponding point between the node 1 and the node n.

In various aspects, each node of the set of nodes 106 can be coupled in parallel with a corresponding switchable terminating resistor, where each switchable terminating resistor comprises any suitable number of electrical resistors and/or any suitable number of electrical switches.

For instance, as shown, an electrical resistor 206(1) and an electrical switch 208(1) can collectively be considered as a switchable terminating resistor of the node 1. Indeed, as shown, the electrical resistor 206(1) and the electrical switch 208(1) can form a series connection that couples the high-line 202 to the low-line 204, which series connection is in parallel with the node 1. In various aspects, if the electrical switch 208(1) is open, electric current from the high-line 202 and/or the low-line 204 can be unable to flow across the electrical resistor 206(1). In such case, the switchable terminating resistor collectively formed by the electrical resistor 206(1) and the electrical switch 208(1) can be considered as electrically inactive, and the node 1 can thus be considered to be in a non-terminating state. In other words, if the electrical switch 208(1) is open, the electrical resistor 206(1) can fail to apply a terminating resistance to (e.g., in parallel with) the node 1. On the other hand, if the electrical switch 208(1) is closed, electric current from the high-line 202 and/or the low-line 204 can flow across the electrical resistor 206(1). In such case, the switchable terminating resistor collectively formed by the electrical resistor 206(1) and the electrical switch 208(1) can be considered as electrically active, and the node 1 can thus be considered to be in a terminating state. In other words, if the electrical switch 208(1) is closed, the electrical resistor 206(1) can apply a terminating resistance to (e.g., in parallel with) the node 1.

As another example, as shown, an electrical resistor 206(j) and an electrical switch 208(j) can collectively be considered as a switchable terminating resistor of the node j. Indeed, as shown, the electrical resistor 206(j) and the electrical switch 208(j) can form a series connection that couples the high-line 202 to the low-line 204, which series connection is in parallel with the node j. In various aspects, if the electrical switch 208(j) is open, electric current from the high-line 202 and/or the low-line 204 can be unable to flow across the electrical resistor 206(j). In such case, the switchable terminating resistor collectively formed by the electrical resistor 206(j) and the electrical switch 208(j) can be considered as electrically inactive, and the node j can thus be considered to be in a non-terminating state. That is, if the electrical switch 208(j) is open, the electrical resistor 206(j) can fail to apply a terminating resistance to (e.g., in parallel with) the node j. On the other hand, if the electrical switch 208(j) is closed, electric current from the high-line 202 and/or the low-line 204 can flow across the electrical resistor 206(j). In such case, the switchable terminating resistor collectively formed by the electrical resistor 206(j) and the electrical switch 208(j) can be considered as electrically active, and the node j can thus be considered to be in a terminating state. That is, if the electrical switch 208(j) is closed, the electrical resistor 206(j) can apply a terminating resistance to (e.g., in parallel with) the node j.

Likewise, as shown, an electrical resistor 206(n) and an electrical switch 208(n) can collectively be considered as a switchable terminating resistor of the node n. Indeed, as shown, the electrical resistor 206(n) and the electrical switch 208(n) can form a series connection that couples the high-line 202 to the low-line 204, which series connection is in parallel with the node n. In various aspects, if the electrical switch 208(n) is open, electric current from the high-line 202 and/or the low-line 204 can be unable to flow across the electrical resistor 206(n). In such case, the switchable terminating resistor collectively formed by the electrical resistor 206(n) and the electrical switch 208(n) can be considered as electrically inactive, and the node n can thus be considered to be in a non-terminating state. That is, if the electrical switch 208(n) is open, the electrical resistor 206(n) can fail to apply a terminating resistance to (e.g., in parallel with) the node n. On the other hand, if the electrical switch 208(n) is closed, electric current from the high-line 202 and/or the low-line 204 can flow across the electrical resistor 206(n). In such case, the switchable terminating resistor collectively formed by the electrical resistor 206(n) and the electrical switch 208(n) can be considered as electrically active, and the node n can thus be considered to be in a terminating state. That is, if the electrical switch 208(n) is closed, the electrical resistor 206(n) can apply a terminating resistance to (e.g., in parallel with) the node n.

Those having ordinary skill in the art will appreciate that the characteristics and/or properties of such switchable terminating resistors can be configured and/or set in any suitable way as desired. For instance, the resistance values of such switchable terminating resistors can be any suitable values as desired (e.g., the terminating resistance of one node can be equal to and/or different from the terminating resistance of any other node).

Furthermore, those having ordinary skill in the art will appreciate that a switchable terminating resistor can be constructed via any suitable number of electrical resistors and/or any suitable number of electrical switches that are configured and/or arranged in any suitable fashion and/or pattern. As an example, the electrical resistor 206(1) is shown as a single resistor for ease of illustration; however, the electrical resistor 206(1) can be an equivalent resistance formed by any suitable number of parallel and/or series resistors (and/or other circuit elements), as desired. Similarly, the electrical resistor 206(j) is shown as a single resistor for ease of illustration; however, the electrical resistor 206(j) can be an equivalent resistance formed by any suitable number of parallel and/or series resistors (and/or other circuit elements), as desired. Likewise, the electrical resistor 206(n) is shown as a single resistor for ease of illustration; however, the electrical resistor 206(n) can be an equivalent resistance formed by any suitable number of parallel and/or series resistors (and/or other circuit elements), as desired.

In any case, each of the set of nodes 106 can be in parallel with a corresponding switchable terminating resistor, such that each node can be converted from a non-terminating state to a terminating state, and/or vice versa, as desired. Because the node 1 and the node n can be at the physical endpoints of the CAN bus 104, the node 1 and the node n can initially be placed in the terminating states, while the rest of the set of nodes 106 can initially be placed in the non-terminating states.

Figure 3:
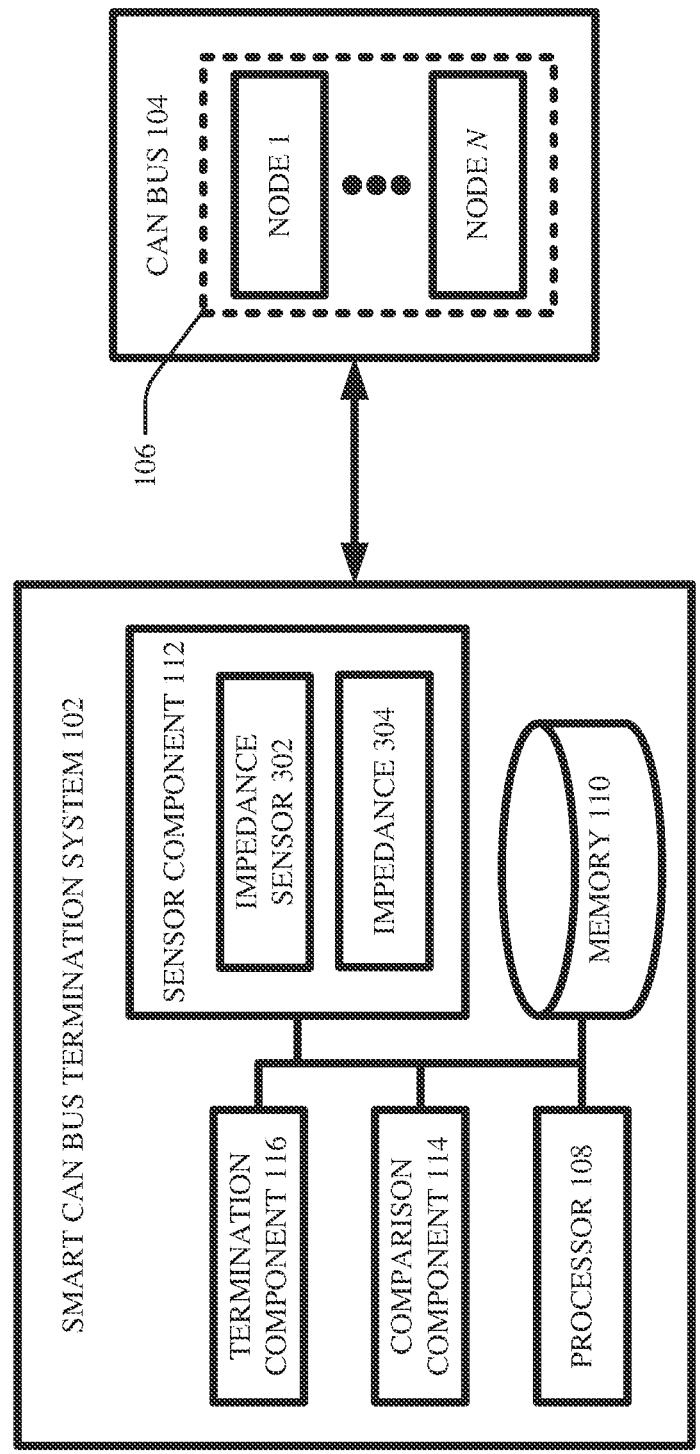
FIG. 3 illustrates a block diagram of an example, non-limiting system including an impedance sensor and an impedance that facilitates smart CAN termination in accordance with one or more embodiments described herein.

FIG. 3 illustrates a block diagram of an example, non-limiting system 300 including an impedance sensor and an impedance that can facilitate smart CAN termination in accordance with one or more embodiments described herein. As shown, the system 300 can, in some cases, comprise the same components as the system 100, and can further comprise an impedance sensor 302 and/or an impedance 304.

In various aspects, the sensor component 112 can comprise the impedance sensor 302. In various aspects, the impedance sensor 302 can be any suitable device that can be electrically integrated with the CAN bus 104 so as to measure and/or otherwise quantify the impedance 304 of the CAN bus 104. In various aspects, the impedance 304 can be a level of impedance exhibited by the CAN bus 104 (e.g., exhibited between the high-line 202 and/or the low-line 204) at any given time. In various other aspects, the impedance 304 can be an average level of impedance exhibited by the CAN bus 104 over any given interval of time. In any case, the impedance 304 can be exhibited by the CAN bus 104, and the impedance sensor 302 can, via any suitable digital and/or analog technique, measure and/or detect the impedance 304. As a non-limiting example, the impedance sensor 302 can be any suitable impedance analyzer and/or multimeter. As another non-limiting example, the impedance sensor 302 can be any suitable combination of circuitry (e.g., differential amplifiers, buffer amplifiers, division circuits, low-pass and/or high-pass filters, comparators) that can be configured to measure electrical impedance.

Figure 4:
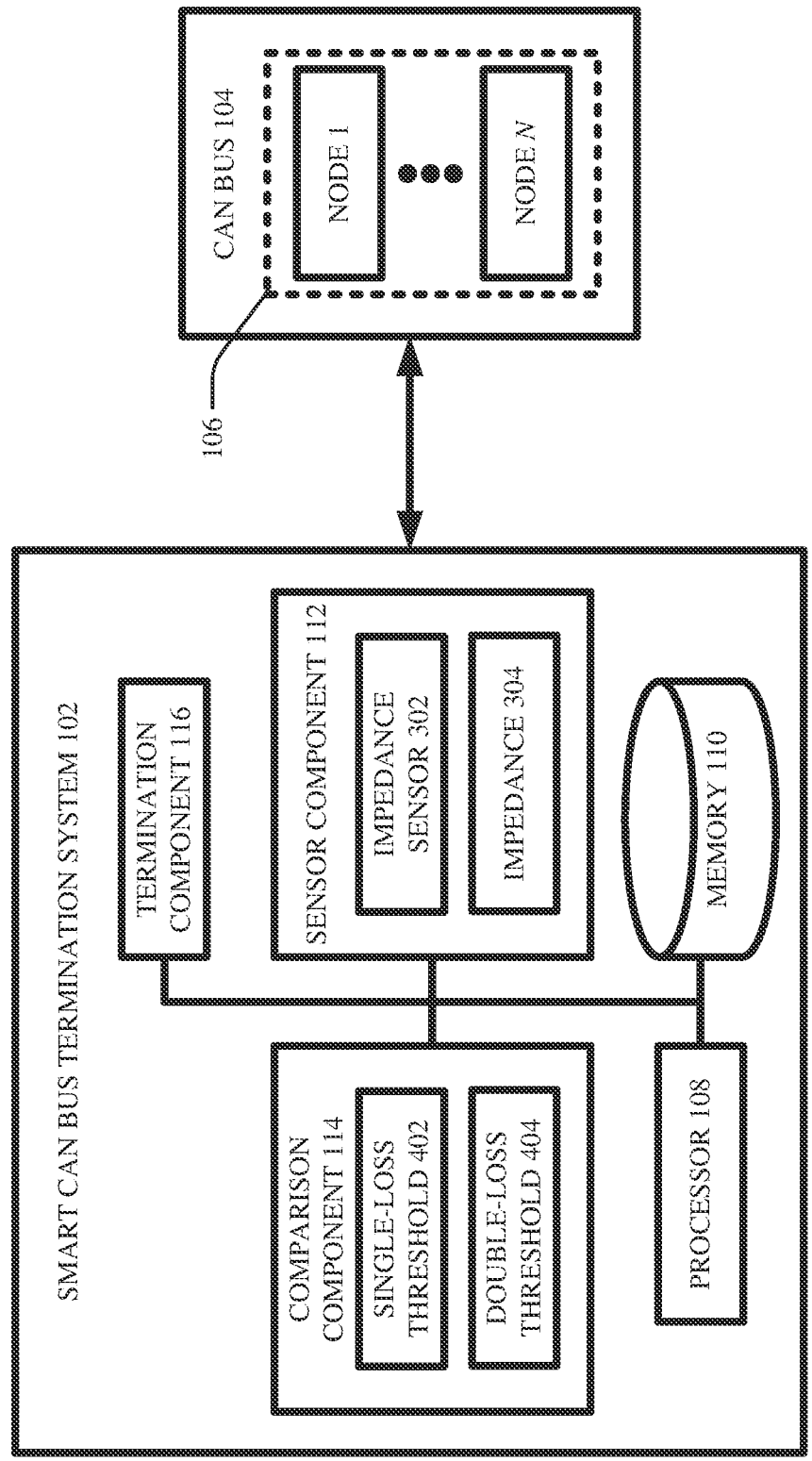
FIG. 4 illustrates a block diagram of an example, non-limiting system including a single-loss threshold and a double-loss threshold that facilitates smart CAN termination in accordance with one or more embodiments described herein.

FIG. 4 illustrates a block diagram of an example, non-limiting system 400 including a single-loss threshold and a double-loss threshold that can facilitate smart CAN termination in accordance with one or more embodiments described herein. As shown, the system 400 can, in some cases, comprise the same components as the system 300, and can further comprise a single-loss threshold 402 and/or a double-loss threshold 404.

In various embodiments, the comparison component 114 can have any suitable form of electronic access to the single-loss threshold 402 and/or to the double-loss threshold 404. In various aspects, the single-loss threshold 402 can be any suitable impedance value that represents a minimum level of impedance that can be exhibited and/or that can be expected to be exhibited by the CAN bus 104 when only one of the terminating nodes of the CAN bus 104 is lost. Those having ordinary skill in the art will understand that the magnitude of the single-loss threshold 402 can depend upon the electrical properties and/or characteristics of the CAN bus 104 (e.g., can depend upon the terminating resistances implemented in the CAN bus 104, can depend upon the number of nodes in the set of nodes 106, can depend upon any other circuitry and/or loads that are involved with the CAN bus 104). Accordingly, those having ordinary skill in the art will appreciate that, in various cases, the single-loss threshold 402 can be determined experimentally and/or analytically based on the CAN bus 104.

Similarly, in various aspects, the double-loss threshold 404 can be any suitable impedance value that represents a minimum level of impedance that can be exhibited and/or that can be expected to be exhibited by the CAN bus 104 when both of the terminating nodes of the CAN bus 104 are lost. Those having ordinary skill in the art will understand that the magnitude of the double-loss threshold 404 can depend upon the electrical properties and/or characteristics of the CAN bus 104 (e.g., can depend upon the terminating resistances implemented in the CAN bus 104, can depend upon the number of nodes in the set of nodes 106, can depend upon any other circuitry and/or loads that are involved with the CAN bus 104). Accordingly, those having ordinary skill in the art will appreciate that, in various cases, the double-loss threshold 404 can be determined experimentally and/or analytically based on the CAN bus 104.

In various instances, the double-loss threshold 404 can be larger than the single-loss threshold 402, due to the rule governing how resistances in parallel sum together.

In various aspects, the comparison component 114 can compare the impedance 304 to the single-loss threshold 402 and/or to the double-loss threshold 404, so as to conclude and/or determine whether and/or how many of the terminating nodes of the CAN bus 104 are lost. More specifically, in various instances, the comparison component 114 can compare the impedance 304 to the double-loss threshold 404. If the comparison component 114 determines that the impedance 304 is greater than the double-loss threshold 404, the comparison component 114 can conclude that the CAN bus 104 has lost both of its terminating nodes. On the other hand, if the comparison component 114 determines, that the impedance 304 is not greater than the double-loss threshold 404, the comparison component 114 can compare the impedance 304 to the single-loss threshold 402. If the comparison component 114 determines that the impedance 304 is greater than the single-loss threshold 402, the comparison component 114 can conclude that the CAN bus 104 has lost only one of its terminating nodes. On the other hand, if the comparison component 114 determines that the impedance 304 is not greater than the single-loss threshold 402, the comparison component 114 can conclude that the CAN bus 104 has not lost any of its terminating nodes.

In other words, the following determinations can be made by the comparison component 114 in various cases. If the impedance 304 is less than both the single-loss threshold 402 and the double-loss threshold 404, it can be inferred that neither terminating node is lost. If the impedance 304 is greater than the single-loss threshold 402 but lesser than the double-loss threshold 404, it can be inferred that one of the terminating nodes is lost. If the impedance 304 is greater than both the single-loss threshold 402 and the double-loss threshold 404, it can be inferred that both of the terminating nodes are lost.

Figure 5:
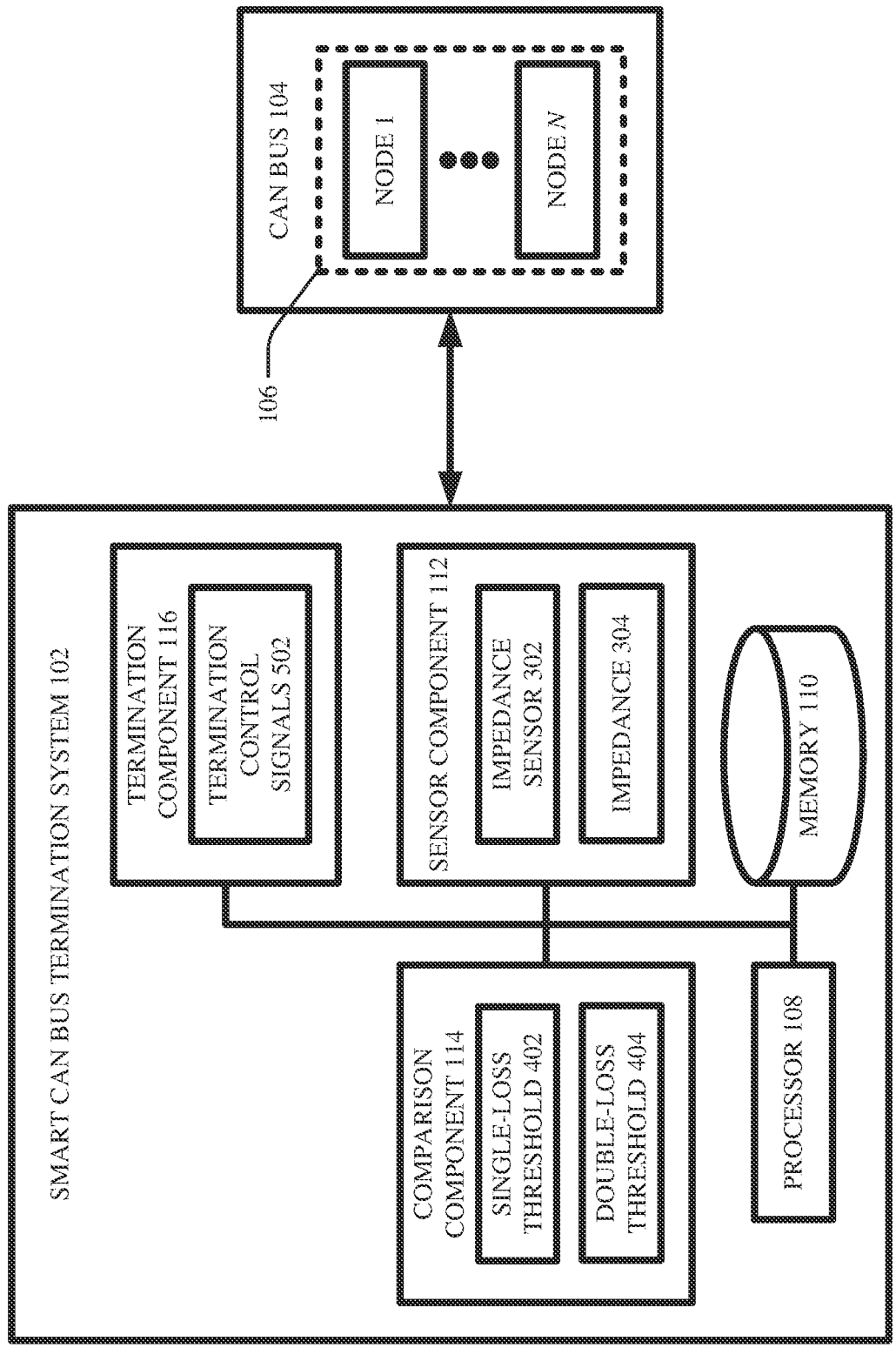
FIG. 5 illustrates a block diagram of an example, non-limiting system including terminating activation signals that facilitates smart CAN termination in accordance with one or more embodiments described herein.

FIG. 5 illustrates a block diagram of an example, non-limiting system 500 including terminating activation signals that can facilitate smart CAN termination in accordance with one or more embodiments described herein. As shown, the system 500 can, in some cases, comprise the same components as the system 400, and can further comprise a set of termination control signals 502.

In various embodiments, the termination component 116 can electronically transmit the set of termination control signals 502 to one or more nodes in the set of nodes 106, based on the conclusion/determination of the comparison component 114.

For example, suppose that the comparison component 114 concludes that both terminating nodes of the CAN bus 104 are lost. That is, node 1 and node n can be lost. In such case, the termination component 116 can identify two remaining nodes of the set of nodes 106 that are respectively adjacent to the two lost terminating nodes. Here, node 1 can be a lost terminating node, and node 2 (not shown) can be a remaining node that is adjacent to node 1. Similarly, node n can be a lost terminating node, and node n−1 (not shown) can be a remaining node that is adjacent to node n. Accordingly, the termination component 116 can convert the node 2 and the node n−1 from non-terminating states to terminating states. That is, the switchable terminating resistor of node 2 can be electrically inactive, and the termination component 116 can transmit a first termination control signal to the switchable terminating resistor of node 2, thereby causing the switchable terminating resistor of node 2 to become electrically active. Likewise, the switchable terminating resistor of node n−1 can be electrically inactive, and the termination component 116 can transmit a second termination control signal to the switchable terminating resistor of node n−1, thereby causing the switchable terminating resistor of node n−1 to become electrically active. In such case, the first and second termination control signals can be considered as the set of termination control signals 502.

Thus, in this non-limiting example, node 1 and node n were the initial two terminating nodes of the CAN bus 104, the CAN bus 104 lost connection with both node 1 and node n, and the termination component 116 converted node 2 and node n−1 to termination states. In other words, node 2 can be considered as a new terminating node that functionally replaces the lost terminating node 1, and node n−1 can be considered as a new terminating node that functionally replaces the lost terminating node n.

As another example, suppose that the comparison component 114 concludes that only one terminating node of the CAN bus 104 is lost. For purposes of this non-limiting example, suppose that node n is lost while node 1 is not lost. In such case, the termination component 116 can identify which of the two terminating nodes is lost. For instance, the termination component 116 can attempt to communicate with both terminating nodes, and the termination component 116 can determine that whichever terminating node fails to properly respond to such attempted communication is lost. Here, the termination component 116 can request a particular type of response from both node 1 and node n. Since node 1 is not lost, node 1 can properly respond to the request. However, since node n is lost, node n can fail to properly respond to the request. Due to the failure of node n to properly respond, the termination component 116 can determine that the node n is lost. Once the lost terminating node is identified, the termination component 116 can identify one remaining node of the set of nodes 106 that is adjacent to the lost terminating node. Here, node n can be the lost terminating node, and node n−1 (not shown) can be a remaining node that is adjacent to node n. Accordingly, the termination component 116 can convert the node n−1 from a non-terminating state to a terminating state. That is, the switchable terminating resistor of node n−1 can be electrically inactive, and the termination component 116 can transmit a termination control signal to the switchable terminating resistor of node n−1, thereby causing the switchable terminating resistor of node n−1 to become electrically active. In such case, this termination control signal can be considered as the set of termination control signals 502 (e.g., a set can contain one or more).

Thus, in this non-limiting example, node 1 and node n were the initial two terminating nodes of the CAN bus 104, the CAN bus 104 lost connection with node n, and the termination component 116 converted node n−1 to a termination state. In other words, node n−1 can be considered as a new terminating node that functionally replaces the lost terminating node n. Thus, the termination nodes of the CAN bus 104 in this non-limiting example can now be node 1 and node n−1.

As yet another example, suppose that the comparison component 114 concludes that only one terminating node of the CAN bus 104 is lost, and suppose that node 1 is lost while node n is not lost. In such case, the termination component 116 can identify which of the two terminating nodes is lost. Again, this can be facilitated by attempting to communicate with both terminating nodes and identifying as lost whichever terminating node fails to properly respond to such attempted communication. Here, the termination component 116 can request a particular type of response from both node 1 and node n. Since node n is not lost, node n can properly respond to the request. However, since node 1 is lost, node 1 can fail to properly respond to the request. Due to the failure of node 1 to properly respond, the termination component 116 can determine that the node 1 is lost. Once the lost terminating node is identified, the termination component 116 can identify one remaining node of the set of nodes 106 that is adjacent to the lost terminating node. Here, node 1 can be the lost terminating node, and node 2 (not shown) can be a remaining node that is adjacent to node 1. Accordingly, the termination component 116 can convert the node 2 from a non-terminating state to a terminating state. That is, the switchable terminating resistor of node 2 can be electrically inactive, and the termination component 116 can transmit a termination control signal to the switchable terminating resistor of node 2, thereby causing the switchable terminating resistor of node 2 to become electrically active. In such case, this termination control signal can be considered as the set of termination control signals 502 (e.g., a set can contain one or more).

Thus, in this non-limiting example, node 1 and node n were the initial two terminating nodes of the CAN bus 104, the CAN bus 104 lost connection with node 1, and the termination component 116 converted node 2 to a termination state. In other words, node 2 can be considered as a new terminating node that functionally replaces the lost terminating node 1. Thus, the termination nodes of the CAN bus 104 in this non-limiting example can now be node 2 and node n.

In various embodiments, the sensor component 112, the comparison component 114, and/or the termination component 116 can repeat their above-described functionalities at any suitable intervals (e.g., the sensor component 112 can periodically measure the impedance of the CAN bus 104; whenever the sensor component 112 measures an impedance, the comparison component 114 can determine whether and/or how many terminating nodes are lost based on the impedance; whenever the comparison component 114 generates a determination as to whether and/or how many terminating nodes are lost, the termination component can convert non-terminating nodes to terminating nodes as appropriate).

Figure 6:
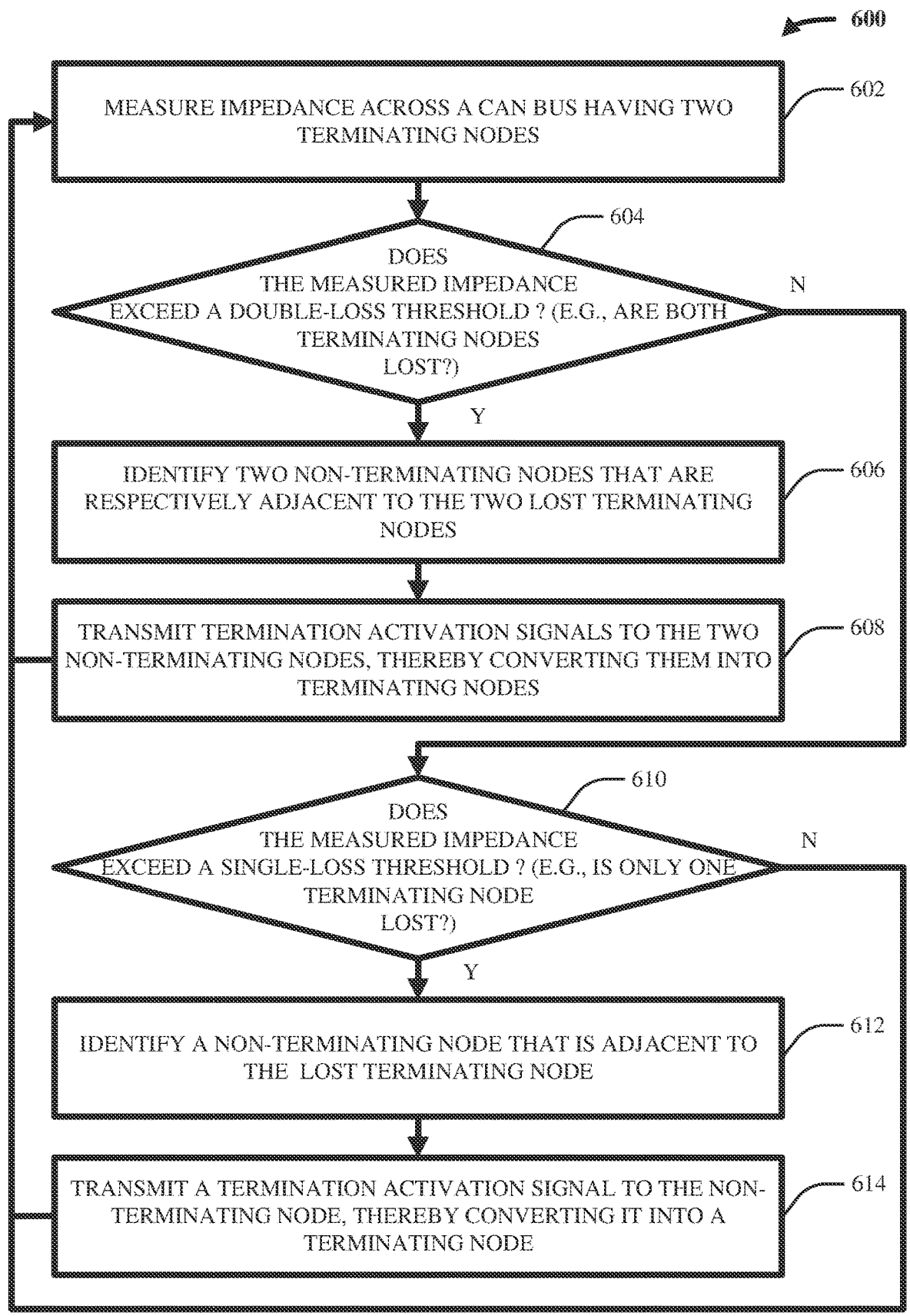
FIG. 6 illustrates a flow diagram of an example, non-limiting computer-implemented method that facilitates smart CAN termination in accordance with one or more embodiments described herein.

FIG. 6 illustrates a flow diagram of an example, non-limiting computer-implemented method 600 that can facilitate smart CAN termination in accordance with one or more embodiments described herein. In various cases, the computer-implemented method 600 can be facilitated by the smart CAN bus termination system 102.

In various embodiments, act 602 can comprise measuring, by a device (e.g., 112) operatively coupled to a processor, an impedance (e.g., 304) across a CAN bus having two terminating nodes (e.g., node 1 and node n).

In various aspects, act 604 can include determining, by the device (e.g., 114), whether the measured impedance exceeds a double-loss threshold (e.g., 404). In other words, the device can determine whether both terminating nodes of the CAN bus are lost. If yes, the computer-implemented method 600 can proceed to act 606. If not, the computer-implemented method 600 can proceed to act 610.

In various instances, act 606 can include identifying, by the device (e.g., 116), two non-terminating nodes (e.g., node 2 and node n−1) that are respectively adjacent to the two lost terminating nodes.

In various cases, act 608 can include transmitting, by the device (e.g., 116), activation signals (e.g., 502), to the two non-terminating nodes, thereby converting them into terminating nodes. In various aspects, the computer-implemented method 600 can proceed back to act 602.

In various instances, act 610 can include determining, by the device (e.g., 114), whether the measured impedance exceeds a single-loss threshold (e.g., 402). In other words, the device can determine whether only one of the terminating nodes of the CAN bus is lost. If yes, the computer-implemented method 600 can proceed to act 612. If not, the computer-implemented method 600 can proceed back to act 602.

In various cases, act 612 can include identifying, by the device (e.g., 116), a non-terminating node that is adjacent to the lost terminating node (e.g., if node 1 is lost, node 2 can be identified; if node n is lost, node n−1 can be identified).

In various aspects, act 614 can include transmitting, by the device (e.g., 116), a termination activation signal (e.g., 502) to the non-terminating node, thereby converting it into a terminating node. In various cases, the computer-implemented method 600 can proceed back to act 602.

As mentioned above, each node of the set of nodes 106 can correspond to a switchable terminating resistor. Those having ordinary skill in the art will appreciate that a switchable terminating resistor can comprise any suitable number of electrical resistance elements arranged in any suitable fashions (e.g., such electrical resistance elements can be arranged in parallel and/or in series with each other). Moreover, those having ordinary skill in the art will appreciate that the switchable terminating resistor can also comprise any suitable number of electrical switches that are coupled in any suitable arrangements to such any suitable electrical resistance elements. A non-limiting example is shown with respect to FIG. 7.

Figure 7:
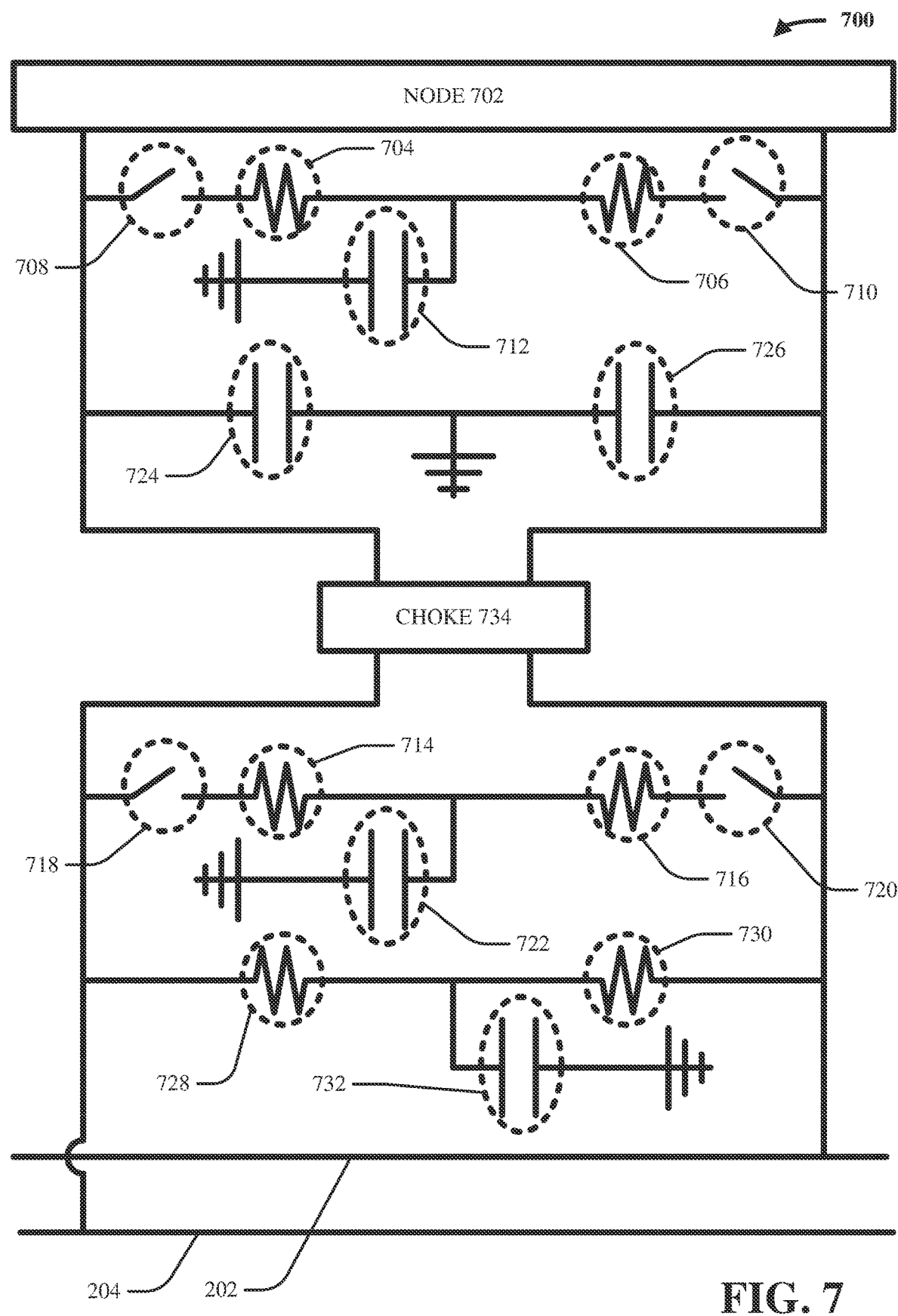
FIG. 7 illustrates a block diagram of an example, non-limiting circuit architecture that facilitates smart CAN termination in accordance with one or more embodiments described herein.

FIG. 7 illustrates a block diagram of an example, non-limiting circuit architecture 700 that can facilitate smart CAN termination in accordance with one or more embodiments described herein. That is, FIG. 7 depicts an example and non-limiting embodiment of a switchable terminating resistor.

In various cases, there can be a node 702 from the set of nodes 106. As shown, the node 702 can be coupled to both the high-line 202 and the low-line 204 of the CAN bus 104.

In various aspects, any suitable circuitry can be implemented between the high-line 202 and the low-line 204 and in parallel with the node 702, so as to achieve any suitable level of energy absorption and/or reflection along the CAN bus 104 with respect to the node 702. For instance, in some cases, an electric choke 734 can be applied to the high-line 202 and the low-line 204 in parallel with the node 702. Moreover, in various aspects, a pair of capacitors 724-726 can be coupled between the high-line 202 and the low-line 204 on one side of the choke 734 (e.g., on the side of the choke 734 that is closer to the node 702). In various cases, an interface between the pair of capacitors 724-726 can be grounded, as shown. Furthermore, in various instances, a pair of resistors 728-730 can be coupled between the high-line 202 and the low-line 204 on another side of the choke 734 (e.g., on the side of the choke 734 that is farther from the node 702). As shown, an interface between the pair of resistors 728-730 can be wired to a capacitor 732 and then to ground. In various aspects, such circuitry can help to ensure that a desired level of energy absorption and/or energy reflection occurs at the node 702 on the CAN bus 104. As those having ordinary skill in the art will understand, the properties and/or characteristics of such circuitry can be configured in any suitable way as desired. As some non-limiting examples, the choke 734 can exhibit an inductance of 100 micro Henrys, the capacitors 724-726 can each exhibit a capacitance of 15 pico Farads, the resistors 728-730 can each exhibit resistances of 1.35 kilo Ohms, and/or the capacitor 732 can exhibit a capacitance of 4.7 nano Farads.

In various aspects, a switchable terminating resistor of the node 702 can comprise a resistor 704, a resistor 706, an electrical switch 708, an electrical switch 710, a capacitor 712, a resistor 714, a resistor 716, an electrical switch 718, an electrical switch 720, and a capacitor 722. Indeed, a first portion of the switchable terminating resistor of the node 702 can comprise the resistor 704, the resistor 706, the electrical switch 708, the electrical switch 710, and the capacitor 712. Moreover, a second portion of the switchable terminating resistor of the node 702 can comprise the resistor 714, the resistor 716, the electrical switch 718, the electrical switch 720, and the capacitor 722.

Consider the first portion. As shown, the low-line 204 can be coupled to the electrical switch 708, which can be coupled to the resistor 704, which can be coupled to the resistor 706, which can be coupled to the electrical switch 710, which can be coupled to the high-line 202. Moreover, as shown, the interface between the resistor 704 and the resistor 706 can be coupled to the capacitor 712, which can then be coupled to ground. Furthermore, as shown, this first portion of the switchable terminating resistor of the node 702 can be located on the side of the choke 734 that is closest to the node 702. As those having ordinary skill in the art will appreciate, the resistor 704, the resistor 706, and/or the capacitor 712 can have any suitable characteristics and/or properties as desired. As a non-limiting example, the resistor 704 and the resistor 706 can each exhibit a resistance of 68 Ohms, and/or the capacitor 712 can exhibit a capacitance of 4.7 nano Farads.

Now, consider the second portion. As shown, the low-line 204 can be coupled to the electrical switch 718, which can be coupled to the resistor 714, which can be coupled to the resistor 716, which can be coupled to the electrical switch 720, which can be coupled to the high-line 202. Additionally, as shown, the interface between the resistor 714 and the resistor 716 can be coupled to the capacitor 722, which can then be coupled to ground. As shown, this second portion of the switchable terminating resistor of the node 702 can be located on the side of the choke 734 that is farthest from the node 702. As those having ordinary skill in the art will appreciate, the resistor 714, the resistor 716, and/or the capacitor 722 can have any suitable characteristics and/or properties as desired. As a non-limiting example, the resistor 714 and the resistor 716 can each exhibit a resistance of 685 Ohms, and/or the capacitor 722 can exhibit a capacitance of 4.7 nano Farads.

As those having ordinary skill in the art will appreciate, the switchable terminating resistor of the node 702 can be considered as electrically inactive when the electrical switches 708, 710, 718, and 720 are all open. In such case, the node 702 can be considered as being in a non-terminating state. On the other hand, the switchable terminating resistor of the node 702 can be considered as electrically active when the electrical switches 708, 710, 718, and 720 are all closed. In such case, the node 702 can be considered as being in a terminating state. Thus, the node 702 can be converted from a non-terminating state to a terminating state (and/or vice versa) by closing (and/or opening) the electrical switches 708, 710, 718, and 720. Although not explicitly shown in FIG. 7, those having ordinary skill in the art will appreciate that the termination component 116 can by coupled to the electrical switches 708, 710, 718, and 720 via any suitable control-logic-circuitry and/or control-logic-wiring. In other words, the termination component 116 can transmit the set of termination control signals 502 to the electrical switches 708, 710, 718, and 720 via such control-logic circuitry and/or wiring, such that the termination component 116 can controllably open and/or close the electrical switches 708, 710, 718, and 720.

Figure 8:
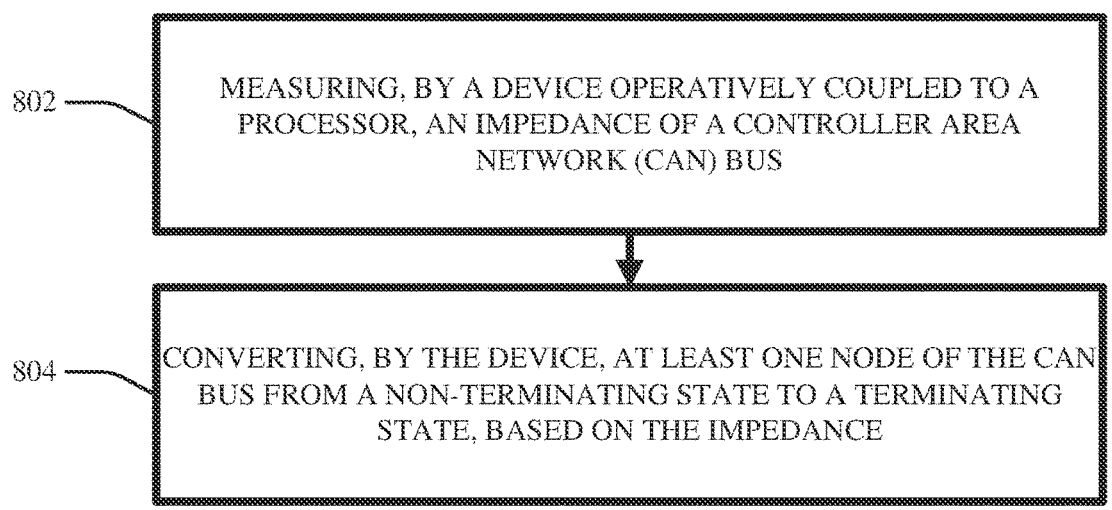
FIG. 8 illustrates a flow diagram of an example, non-limiting computer-implemented method that facilitates smart CAN termination in accordance with one or more embodiments described herein.

FIG. 8 illustrates a flow diagram of an example, non-limiting computer-implemented method 800 that an facilitate smart CAN termination in accordance with one or more embodiments described herein. In various cases, the smart CAN bus termination system 102 can facilitate the computer-implemented method 800.

In various embodiments, act 802 can include measuring, by a device (e.g., 112) operatively coupled to a processor, an impedance (e.g., 304) of a controller area network (CAN) bus (e.g., 104).

In various aspects, act 804 can include converting, by the device (e.g., 116), at least one node (e.g., one of 106) from a non-terminating state to a terminating state, based on the impedance.

Although not explicitly shown in FIG. 8, the at least one node of the CAN bus can be associated with a switchable terminating resistor (e.g., collectively 704, 706, 708, 710, 712, 714, 716, 718, 720, and 722) having one or more switches (e.g., 708, 710, 718, and 720), wherein the at least one node is in the non-terminating state when the one or more switches are open, and wherein the at least one node is in the terminating state when the one or more switches are closed.

Although not explicitly shown in FIG. 8, the converting the at least one node from the non-terminating state to the terminating state can comprise: transmitting, by the device (e.g., 116), a control signal (e.g., 502) to the one or more switches, which can cause the one or more switches to close.

Although not explicitly shown in FIG. 8, the CAN bus can include a high-line (e.g., 202) and a low-line (e.g., 204), and the switchable terminating resistor can include: a choke (e.g., 734) applied to the high-line and the low-line; a first pair of resistors (e.g., 704 and 706) in series with a first pair of switches (e.g., 708 and 710) on a first side of the choke, wherein the first pair of resistors in series with the first pair of switches couple the high-line to the low-line when the first pair of switches are closed; and a second pair of resistors (e.g., 714 and 716) in series with a second pair of switches (e.g., 718 and 720) on a second side of the choke, wherein the second pair of resistors in series with the second pair of switches couple the high-line to the low-line when the second pair of switches are closed.

Although not explicitly shown in FIG. 8, the computer-implemented method 800 can further comprise: comparing, by the device (e.g., 114), the impedance to a first threshold value (e.g., 402), wherein the converting the at least one node comprises converting, by the device (e.g., 116), one of the at least one node from the non-terminating state to the terminating state based on the comparing indicating that the impedance exceeds the first threshold value.

Although not explicitly shown in FIG. 8, the computer-implemented method 800 can further comprise: comparing, by the device (e.g., 114), the impedance to a second threshold value (e.g., 404) that is higher than the first threshold value, wherein the converting the at least one node comprises converting, by the device (e.g., 116), two of the at least one node from non-terminating states to terminating states based on the comparing indicating that the impedance exceeds the second threshold value.

Although not explicitly shown in FIG. 8, the CAN bus can be a controller area network flexible data-rate (CAN-FD) bus.

Various embodiments of the invention constitute a computerized tool that can electronically monitor the impedance of a CAN bus; that can electronically determine whether and/or how many terminating nodes of the CAN bus are lost, based on the impedance; and/or that can electronically convert one or more remaining nodes of the CAN bus from non-terminating states to terminating states, so as to replace the lost terminating nodes. Accordingly, an amount of time during which the CAN bus is not properly terminated and is thus experiencing degraded performance can be decreased by the computerized tool. Indeed, experimental simulations conducted by the inventors of various embodiments of the invention verified that the computerized tool described herein can restore signal quality and/or electromagnetic compatibility of a CAN bus when one or more terminating nodes of the CAN bus are lost. Thus, the computerized tool as described herein can be considered as a concrete and tangible technical improvement in the field of controller area networks.

Those having ordinary skill in the art will appreciate that the herein disclosure describes non-limiting examples of various embodiments of the subject innovation. For ease of description and/or explanation, various portions of the herein disclosure utilize the term "each" when discussing various embodiments of the subject innovation. Those having ordinary skill in the art will appreciate that such usages of the term "each" are non-limiting examples. In other words, when the herein disclosure provides a description that is applied to "each" of some particular computerized object and/or component, it should be understood that this is a non-limiting example of various embodiments of the subject innovation, and it should be further understood that, in various other embodiments of the subject innovation, it can be the case that such description applies to fewer than "each" of that particular computerized object.

Figure 9:
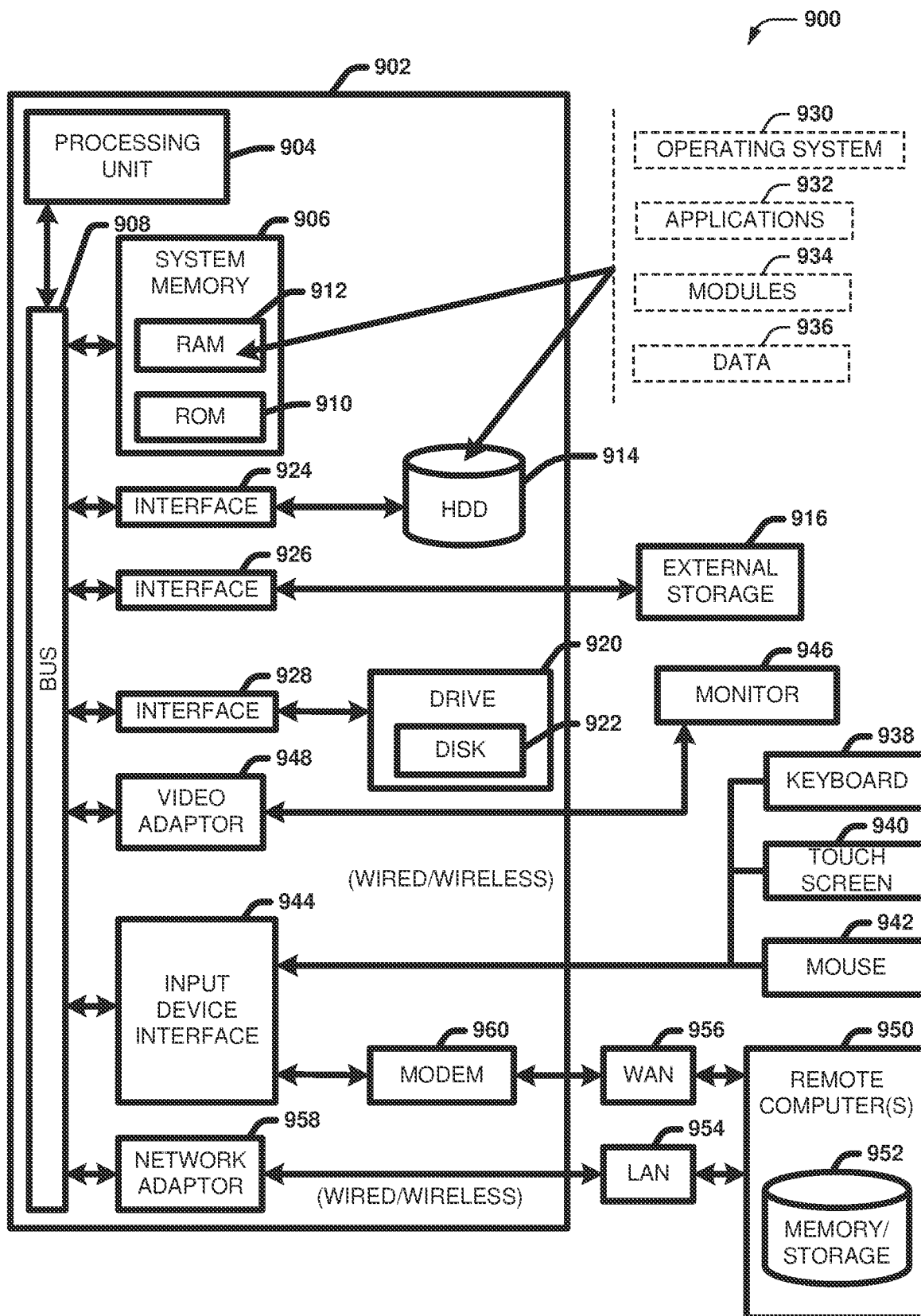
FIG. 9 illustrates a block diagram of an example, non-limiting operating environment in which one or more embodiments described herein can be facilitated.

In order to provide additional context for various embodiments described herein, FIG. 9 and the following discussion are intended to provide a brief, general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), one or more external storage devices 916 (e.g., a magnetic floppy disk drive (FDD) 916, a memory stick or flash drive reader, a memory card reader, etc.) and a drive 920, e.g., such as a solid state drive, an optical disk drive, which can read or write from a disk 922, such as a CD-ROM disc, a DVD, a BD, etc. Alternatively, where a solid state drive is involved, disk 922 would not be included, unless separate. While the internal HDD 914 is illustrated as located within the computer 902, the internal HDD 914 can also be configured for external use in a suitable chassis (not shown). Additionally, while not shown in environment 900, a solid state drive (SSD) could be used in addition to, or in place of, an HDD 914. The HDD 914, external storage device(s) 916 and drive 920 can be connected to the system bus 908 by an HDD interface 924, an external storage interface 926 and a drive interface 928, respectively. The interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) of multiple VMs hosted at computer 902. Furthermore, operating system 930 can provide runtime environments, such as the Java runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and settings for an application.

Further, computer 902 can be enable with a security module, such as a trusted processing module (TPM). For instance with a TPM, boot components hash next in time boot components, and wait for a match of results to secured values, before loading a next boot component. This process can take place at any layer in the code execution stack of computer 902, e.g., applied at the application execution level or at the operating system (OS) kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 904 through an input device interface 944 that can be coupled to the system bus 908, but can be connected by other interfaces, such as a parallel port, an IEEE 1394 serial port, a game port, a USB port, an IR interface, a BLUETOOTH® interface, etc.

A monitor 946 or other type of display device can be also connected to the system bus 908 via an interface, such as a video adapter 948. In addition to the monitor 946, a computer typically includes other peripheral output devices (not shown), such as speakers, printers, etc.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 952 is illustrated. The logical connections depicted include wired/wireless connectivity to a local area network (LAN) 954 and/or larger networks, e.g., a wide area network (WAN) 956. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 954 through a wired and/or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 or can be connected to a communications server on the WAN 956 via other means for establishing communications over the WAN 956, such as by way of the Internet. The modem 960, which can be internal or external and a wired or wireless device, can be connected to the system bus 908 via the input device interface 944. In a networked environment, program modules depicted relative to the computer 902 or portions thereof, can be stored in the remote memory/storage device 952. It will be appreciated that the network connections shown are example and other means of establishing a communications link between the computers can be used.

When used in either a LAN or WAN networking environment, the computer 902 can access cloud storage systems or other network-based storage systems in addition to, or in place of, external storage devices 916 as described above, such as but not limited to a network virtual machine providing one or more aspects of storage or processing of information. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 10:
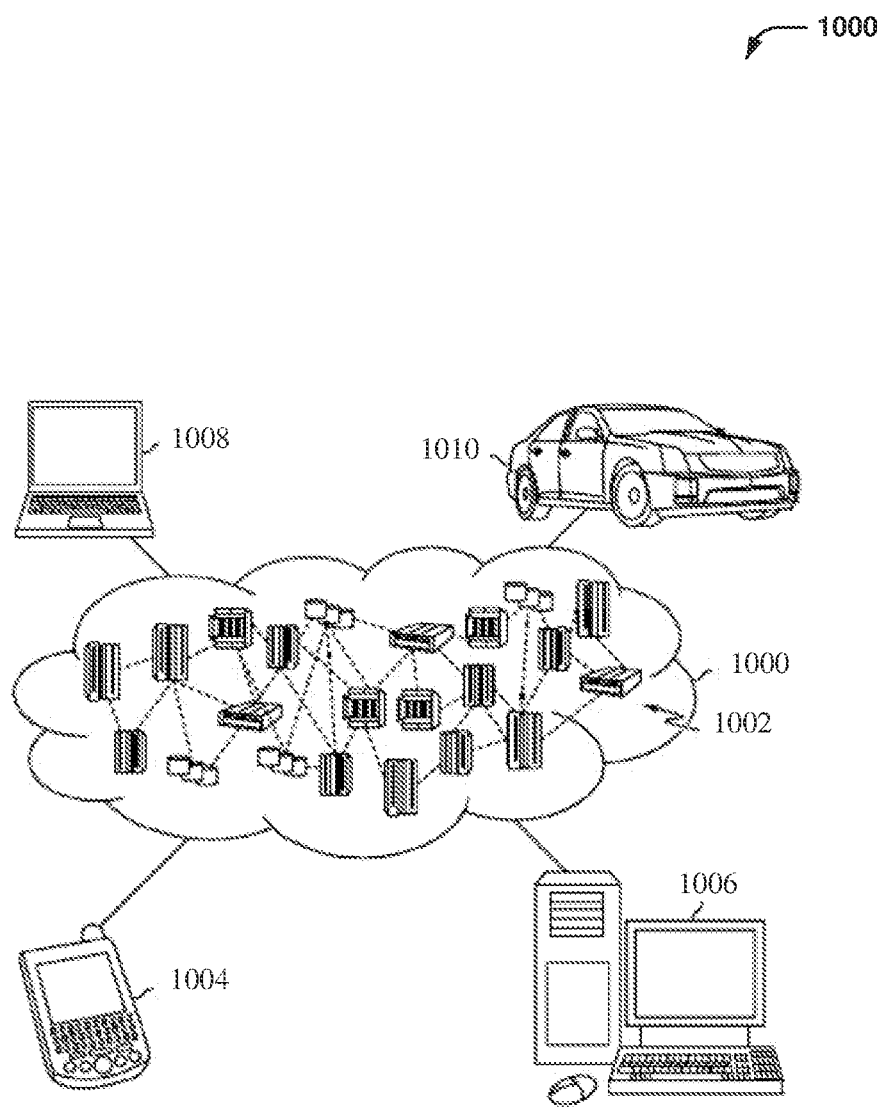
FIG. 10 illustrates an example, non-limiting cloud computing environment in accordance with one or more embodiments described herein.

Referring now to FIG. 10, illustrative cloud computing environment 1000 is depicted. As shown, cloud computing environment 1000 includes one or more cloud computing nodes 1002 with which local computing devices used by cloud consumers, such as, for example, personal digital assistant (PDA) or cellular telephone 1004, desktop computer 1006, laptop computer 1008, and/or automobile computer system 1010 may communicate. Nodes 1002 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1004-1010 shown in FIG. 10 are intended to be illustrative only and that computing nodes 1002 and cloud computing environment 1000 can communicate with any type of computerized device over any type of network and/or network addressable connection (e.g., using a web browser).

Figure 11:
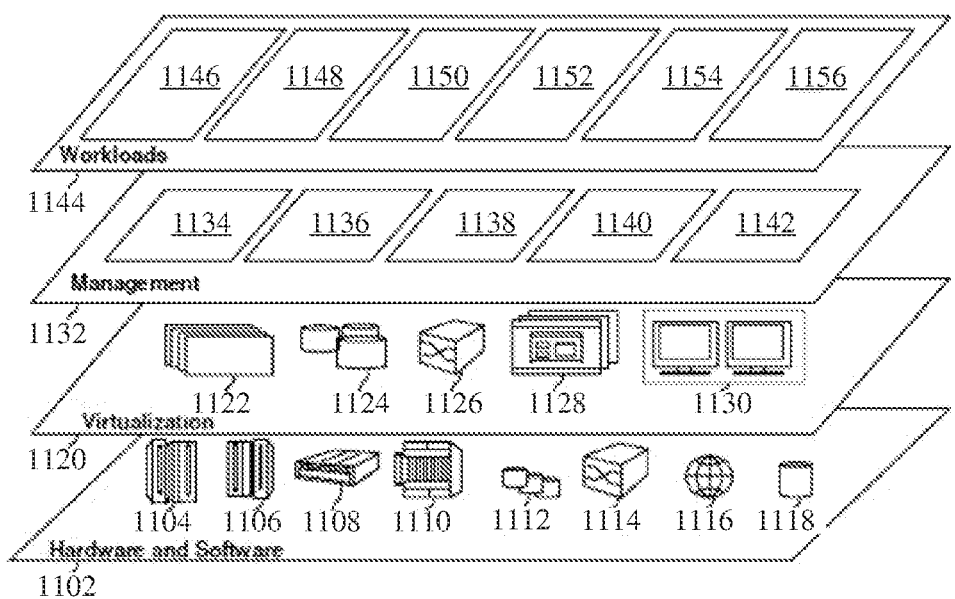
FIG. 11 illustrates example, non-limiting abstraction model layers in accordance with one or more embodiments described herein.

Referring now to FIG. 11, a set of functional abstraction layers 1100 provided by cloud computing environment 1000 (FIG. 10) is shown. Repetitive description of like elements employed in other embodiments described herein is omitted for sake of brevity. It should be understood in advance that the components, layers, and functions shown in FIG. 11 are intended to be illustrative only and embodiments of the invention are not limited thereto. As depicted, the following layers and corresponding functions are provided.

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124;

virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and differentially private federated learning processing 1156. Various embodiments of the present invention can utilize the cloud computing environment described with reference to FIGS. 10 and 11 to execute one or more differentially private federated learning process in accordance with various embodiments described herein.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adaptor card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a processor that executes computer-executable components stored in a computer-readable memory, the computer-executable components comprising:
a sensor component that measures an impedance of a controller area network (CAN) bus;
a termination component that converts at least one node of the CAN bus from a non-terminating state to a terminating state, based on the impedance; and
a comparison component that compares the impedance to a first threshold value and to a second threshold value that is higher than the first threshold value, wherein the termination component:
converts one of the at least one node from the non-terminating state to the terminating state if the comparison component determines that the impedance exceeds the first threshold value, and converts two of the at least one node from non-terminating states to terminating states if the comparison component determines that the impedance exceeds the second threshold value.

2. The system of claim 1, wherein the at least one node of the CAN bus is associated with a switchable terminating resistor having one or more switches, wherein the at least one node is in the non-terminating state when the one or more switches are open, and wherein the at least one node is in the terminating state when the one or more switches are closed.

3. The system of claim 2, wherein the termination component converts the at least one node from the non-terminating state to the terminating state by transmitting a control signal to the one or more switches, which causes the one or more switches to close.

4. The system of claim 2, wherein the CAN bus includes a high-line and a low-line, and wherein the switchable terminating resistor includes:
a choke applied to the high-line and the low-line;
a first pair of resistors in series with a first pair of switches on a first side of the choke, wherein the first pair of resistors in series with the first pair of switches couple the high-line to the low-line when the first pair of switches are closed; and
a second pair of resistors in series with a second pair of switches on a second side of the choke, wherein the second pair of resistors in series with the second pair of switches couple the high-line to the low-line when the second pair of switches are closed.

5. The system of claim 1, wherein the CAN bus is a controller area network flexible data-rate (CAN-FD) bus.

6. The system of claim 1, wherein the respective nodes of the at least one node are associated with respective switchable terminating resistors.

7. The system of claim 1, wherein the CAN bus comprises at least three nodes.

8. A computer-implemented method, comprising:
measuring, by a device operatively coupled to a processor, an impedance of a controller area network (CAN) bus, wherein the CAN bus comprises a high-line, a low-line, and at least one switchable terminating resistor that comprises:
a choke applied to the high-line and the low-line;
a first pair of resistors in series with a first pair of switches on a first side of the choke, wherein the first pair of resistors in series with the first pair of switches couple the high-line to the low-line when the first pair of switches are closed; and
a second pair of resistors in series with a second pair of switches on a second side of the choke, wherein the second pair of resistors in series with the second pair of switches couple the high-line to the low-line when the second pair of switches are closed; and
converting, by the device, at least one node of the CAN bus from a non-terminating state to a terminating state, based on the impedance.

9. The computer-implemented method of claim 8, wherein the at least one node of the CAN bus is associated with the at least one switchable terminating resistor having switches comprising the first pair of switches and the second pair of switches, wherein a node of the at least one node is in the non-terminating state when one or more of the switches corresponding to the node are open, and wherein the node is in the terminating state when the one or more switches of the switches corresponding to the node are closed.

10. The computer-implemented method of claim 9, wherein the converting the at least one node from the non-terminating state to the terminating state comprises:

transmitting, by the device, a control signal to the one or more of the switches corresponding to the at least one node, which causes the one or more of the switches corresponding to the at least one node to close.

11. The computer-implemented method of claim 8, further comprising:

comparing, by the device, the impedance to a first threshold value, wherein the converting the at least one node comprises converting, by the device, one of the at least one node from the non-terminating state to the terminating state based on the comparing indicating that the impedance exceeds the first threshold value.

12. The computer-implemented method of claim 11, further comprising:

comparing, by the device, the impedance to a second threshold value that is higher than the first threshold value, wherein the converting the at least one node comprises converting, by the device, two of the at least one node from non-terminating states to terminating states based on the comparing indicating that the impedance exceeds the second threshold value.

13. The computer-implemented method of claim 8, wherein the CAN bus is a controller area network flexible data-rate (CAN-FD) bus.

14. A computer program product for facilitating smart controller area network termination, the computer program product comprising a non-transitory computer-readable medium having program instructions embodied therewith, the program instructions executable by a processor to cause the processor to:

measure, by the processor, an impedance of a controller area network (CAN) bus; and convert, by the processor, at least one node of the CAN bus from a non-terminating state to a terminating state, based on the impedance, comprising:

compare the impedance to a first threshold value and to a second threshold value that is higher than the first threshold value, converts one of the at least one node from the non-terminating state to the terminating state if the comparison component determines that the impedance exceeds the first threshold value, and converts two of the at least one node from non-terminating states to terminating states if the comparison component determines that the impedance exceeds the second threshold value.

15. The computer program product of claim 14, wherein the at least one node of the CAN bus is associated with a switchable terminating resistor having one or more switches, wherein the at least one node is in the non-terminating state when the one or more switches are open, and wherein the at least one node is in the terminating state when the one or more switches are closed.

16. The computer program product of claim 15, wherein the processor converts the at least one node from the non-terminating state to the terminating state by:

transmitting, by the processor, a control signal to the one or more switches, which causes the one or more switches to close.

17. The computer program product of claim 15, wherein the CAN bus includes a high-line and a low-line, and wherein the switchable terminating resistor includes:

a choke applied to the high-line and the low-line;

a first pair of resistors in series with a first pair of switches on a first side of the choke, wherein the first pair of resistors in series with the first pair of switches couple the high-line to the low-line when the first pair of switches are closed; and a second pair of resistors in series with a second pair of switches on a second side of the choke, wherein the second pair of resistors in series with the second pair of switches couple the high-line to the low-line when the second pair of switches are closed.

18. The computer program product of claim 14, wherein the CAN bus is a controller area network flexible data-rate (CAN-FD) bus.

19. The computer program product of claim 14, wherein the respective nodes of the at least one node are associated with respective switchable terminating resistors.

20. The computer program product of claim 14, wherein the CAN bus comprises at least three nodes.

\* \* \* \* \*